April 23, 1968   E. R. ALLER ETAL   3,379,478
RAILWAY CARS FOR TRANSPORTING PULVERULENT MATERIAL LADINGS
Filed Feb. 16, 1966   12 Sheets-Sheet 1
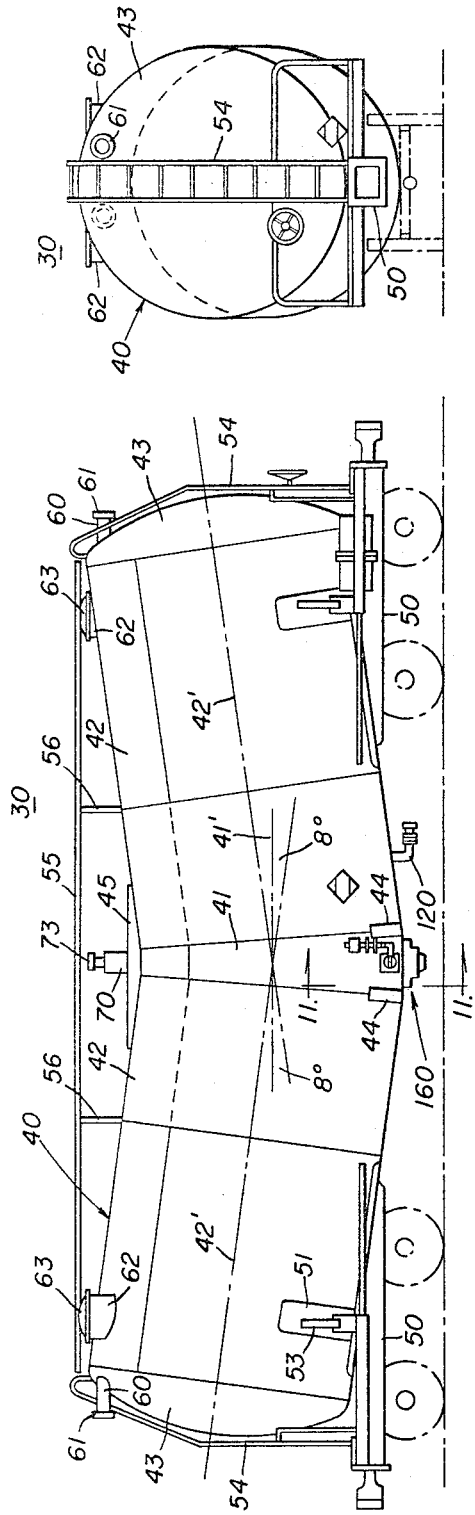
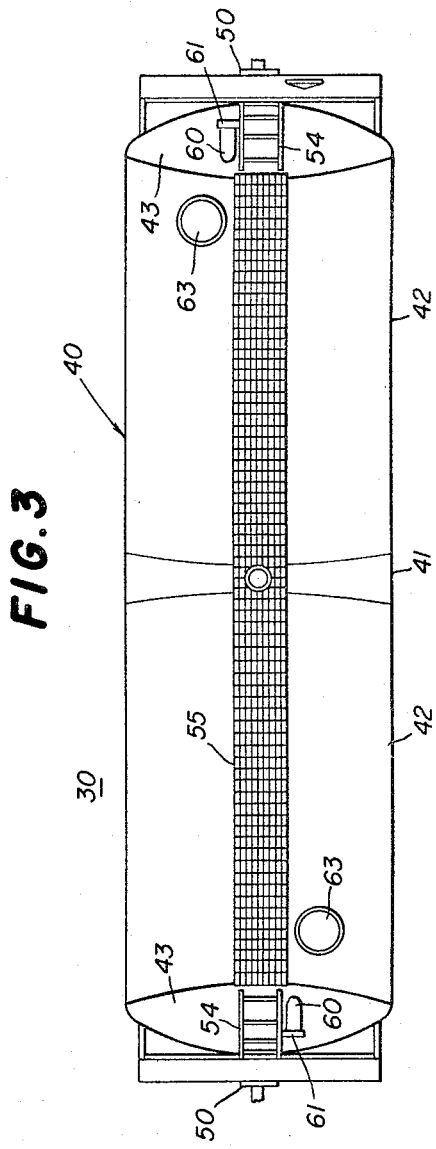
INVENTORS
EDMUND R. ALLER
ROBERT F. LOOMIS
BY
Prangley, Baird, Clayton,
Miller & Vogel
ATTYS.

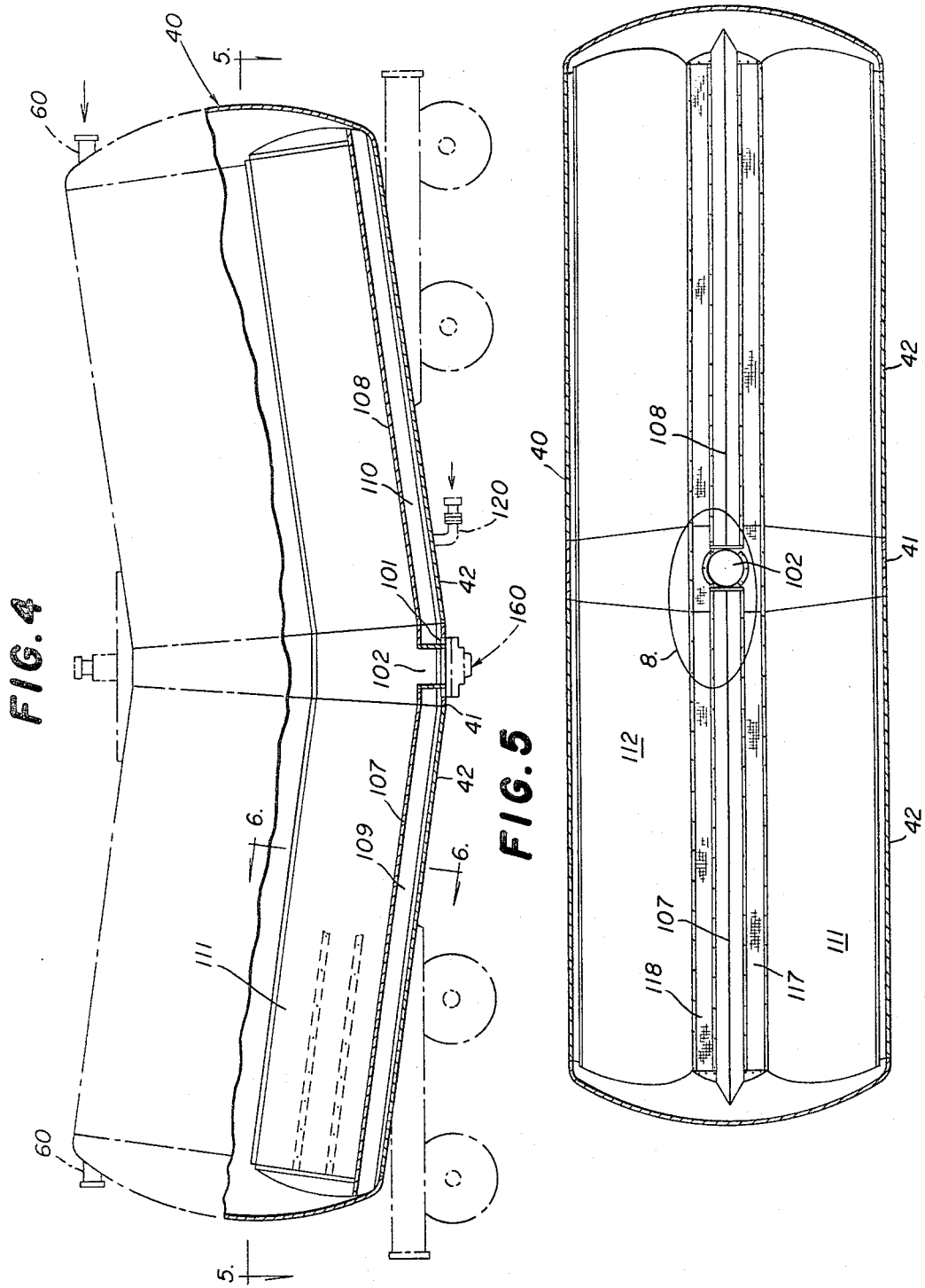

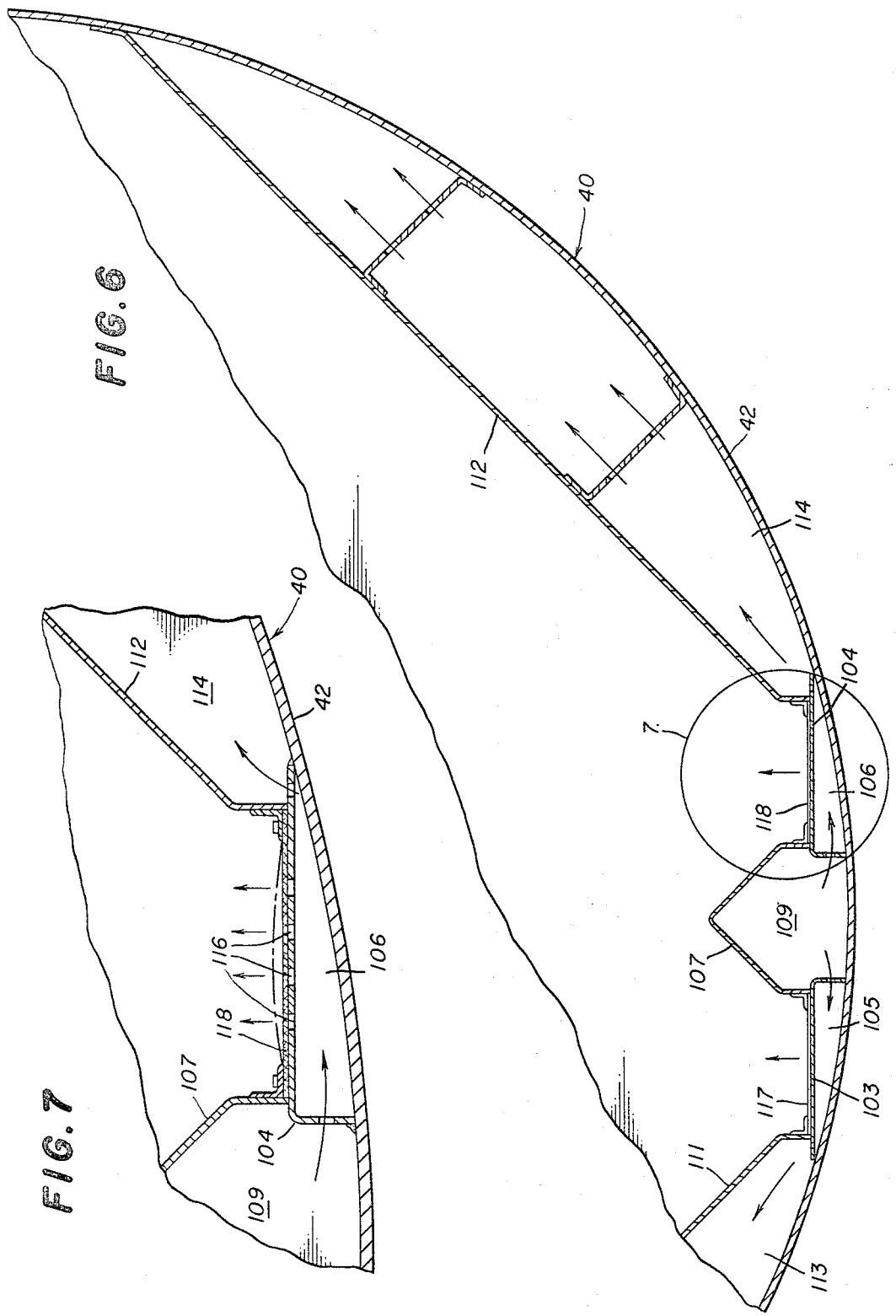

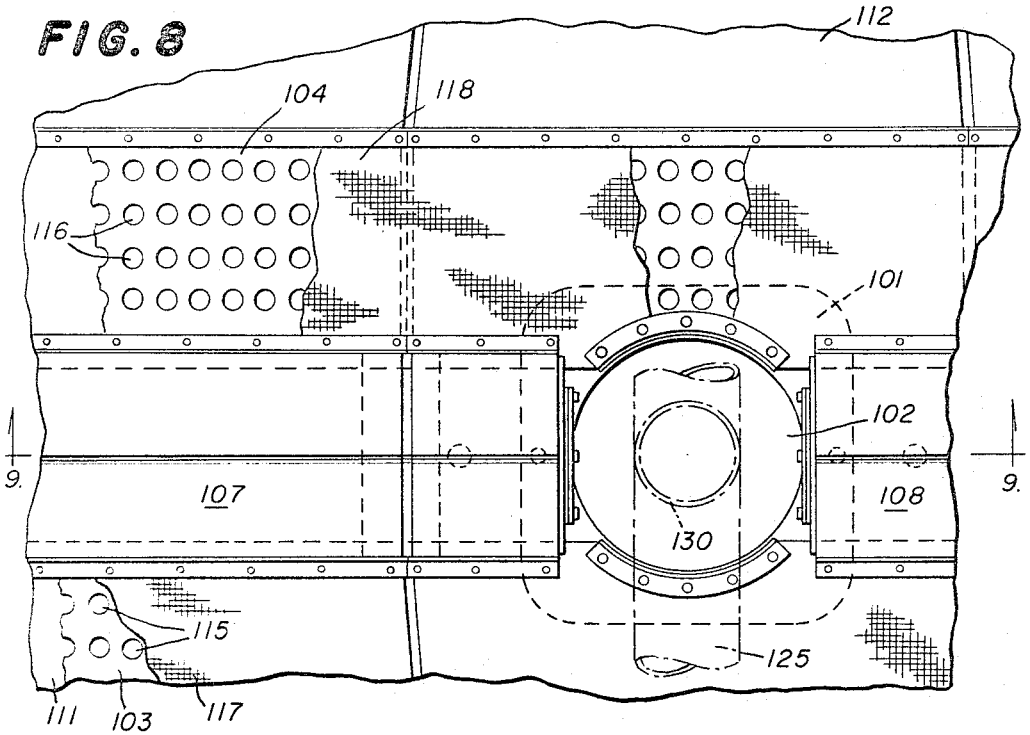
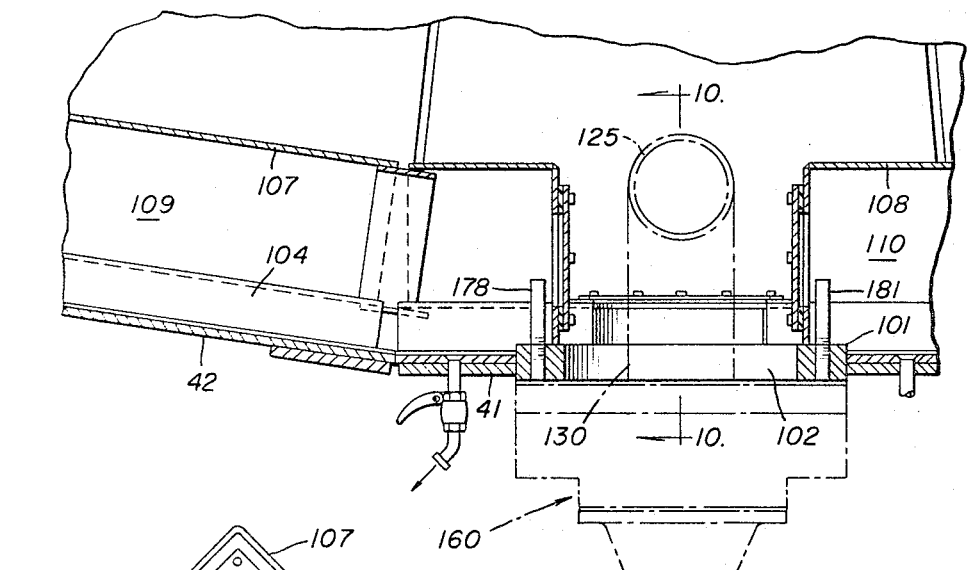
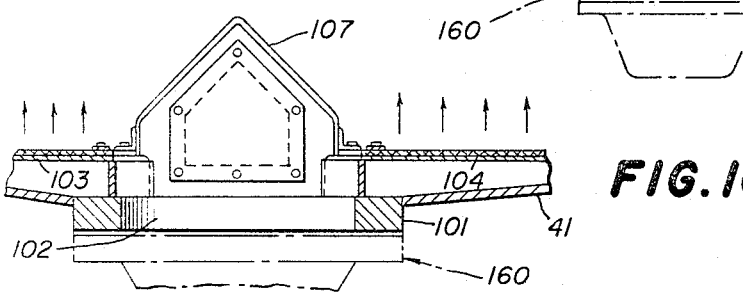

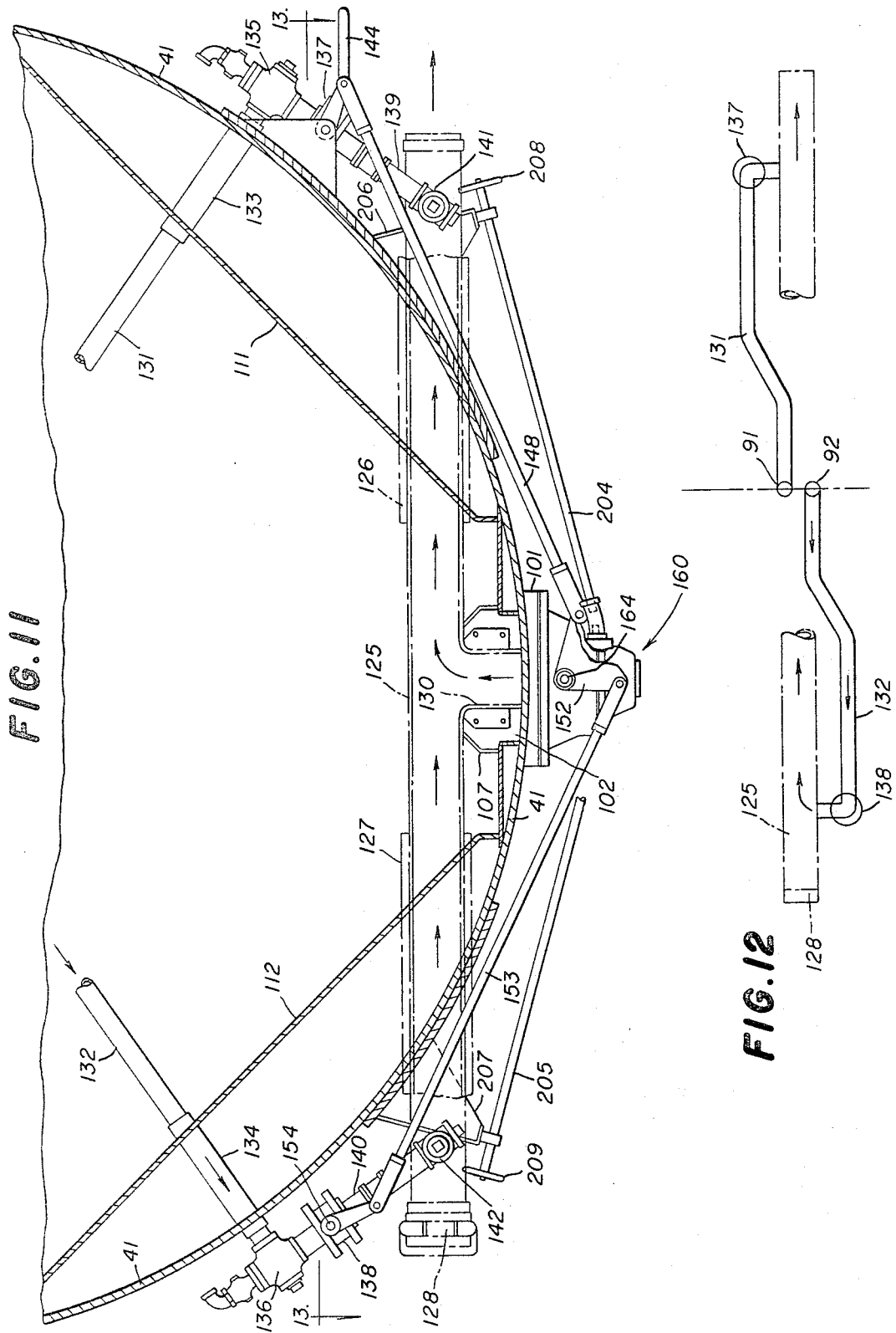

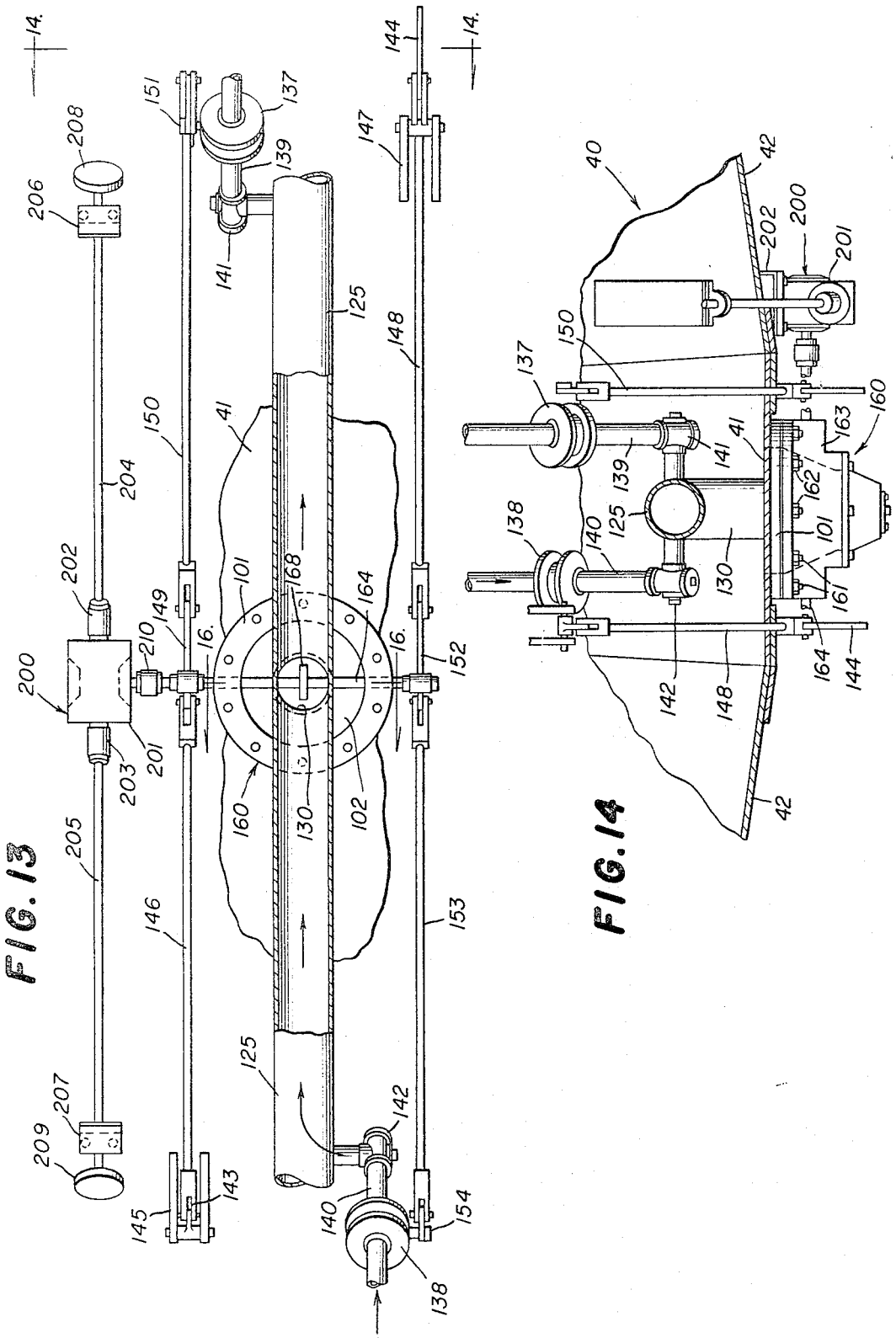

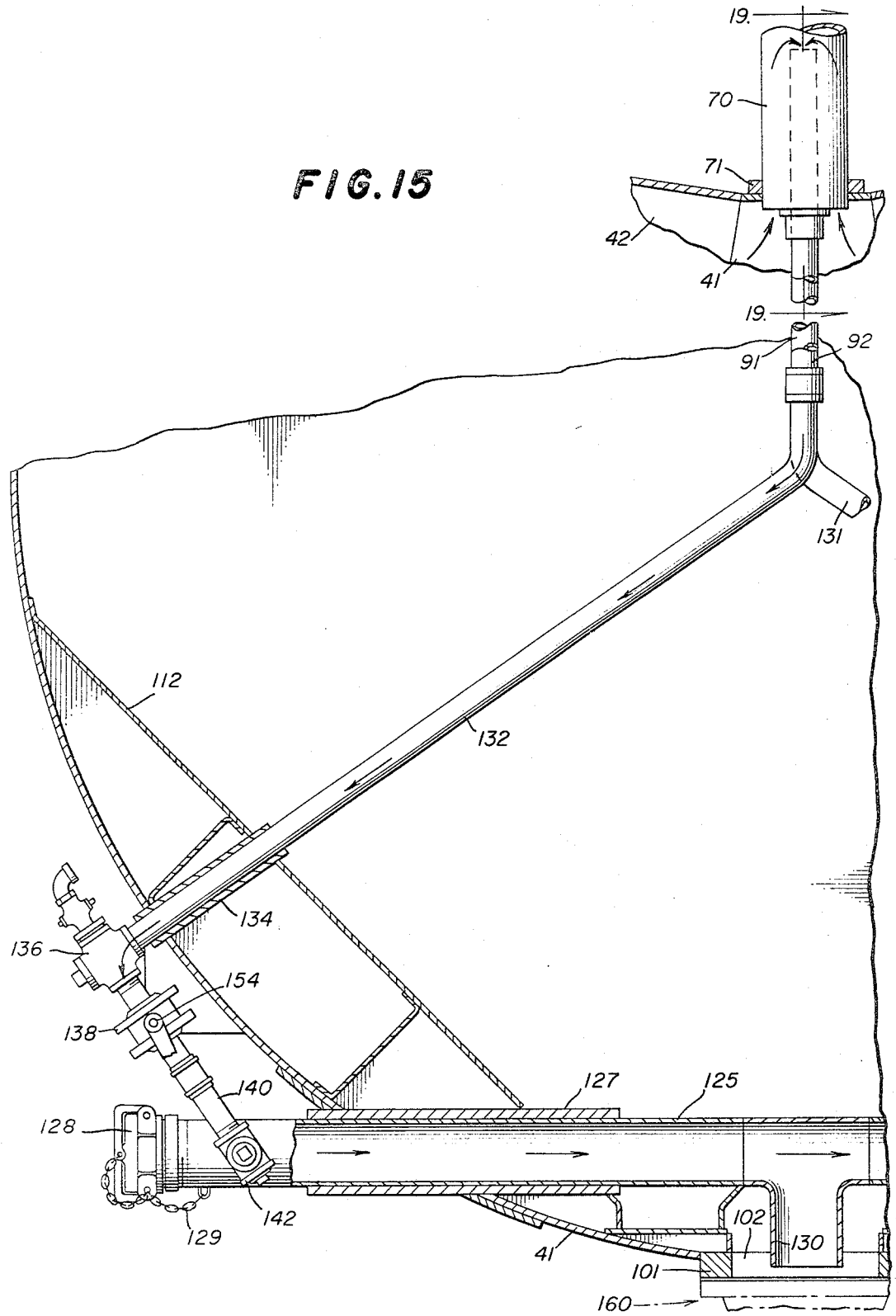

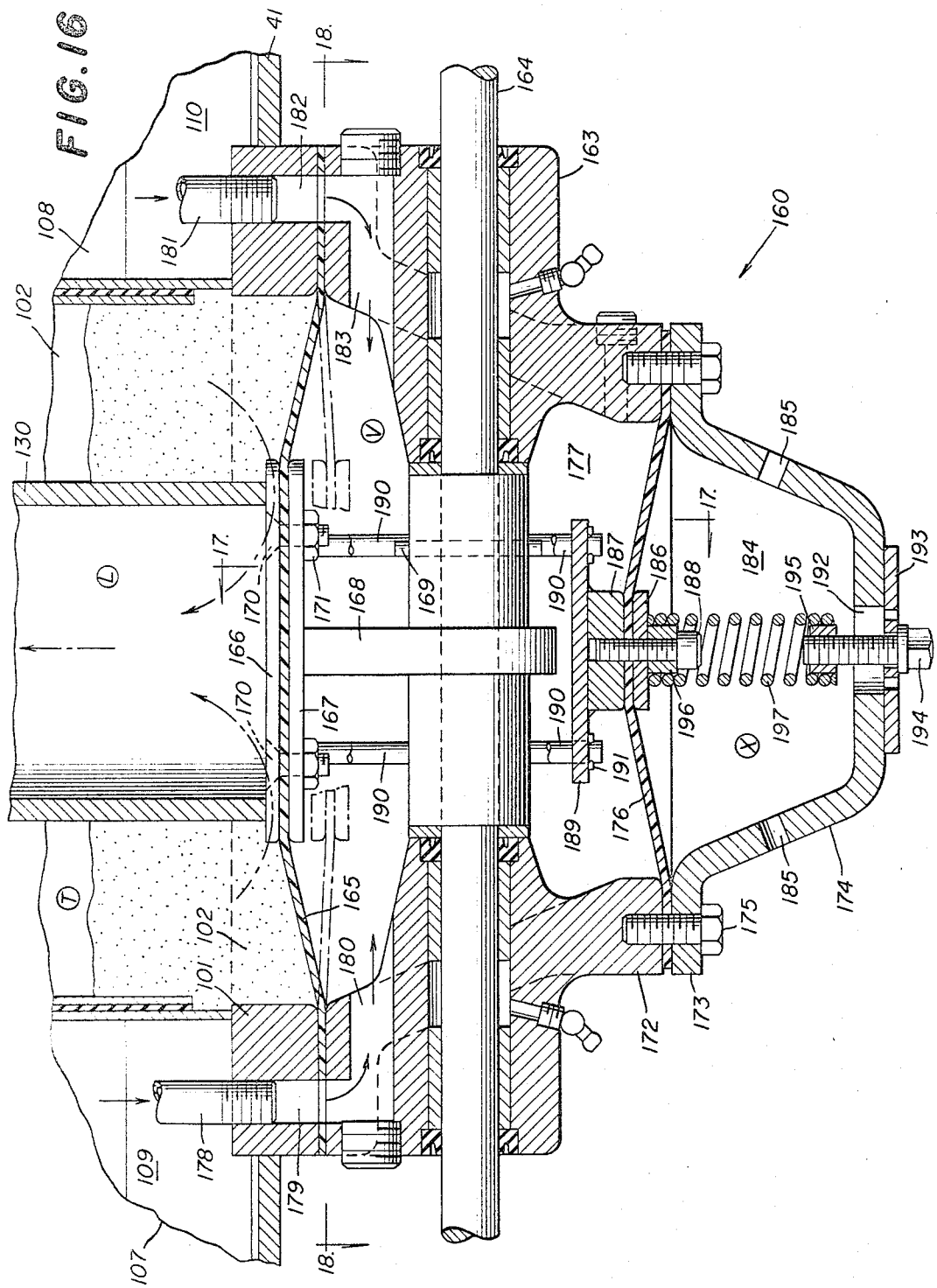

April 23, 1968 E. R. ALLER ETAL 3,379,478
RAILWAY CARS FOR TRANSPORTING PULVERULENT MATERIAL LADINGS
Filed Feb. 16, 1966 12 Sheets-Sheet 9

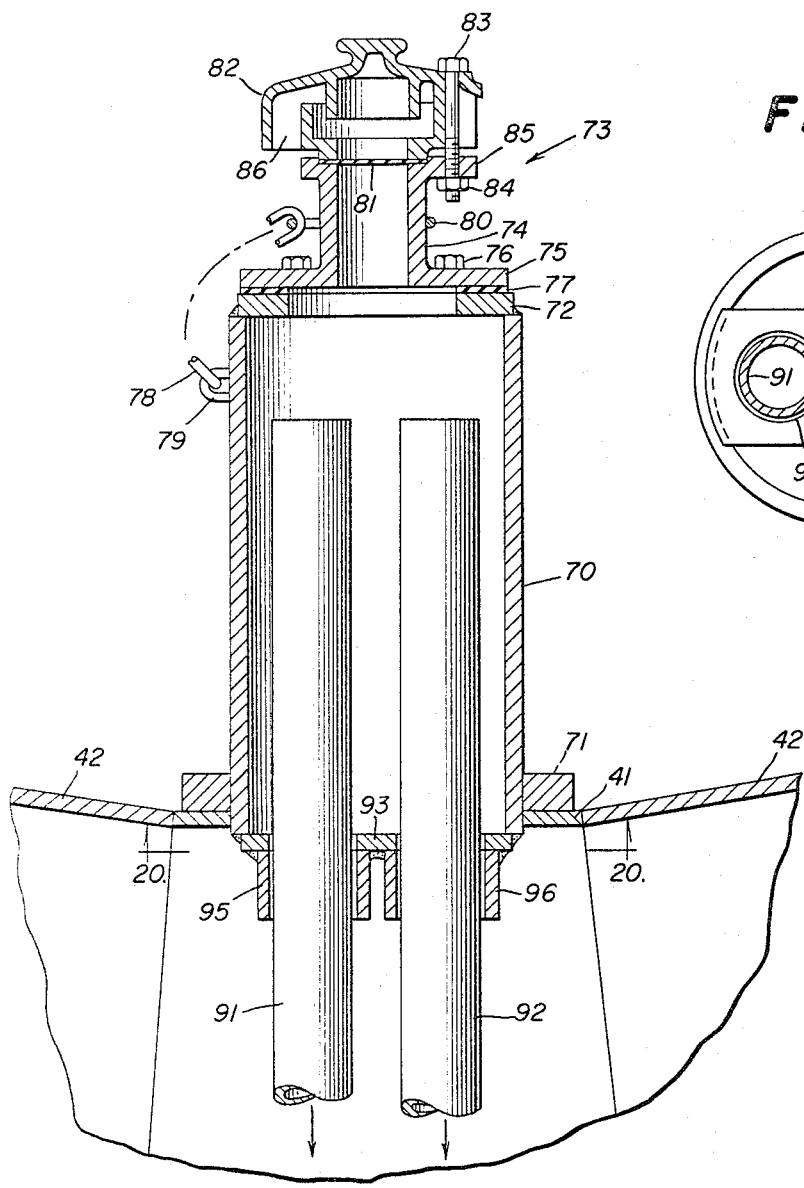
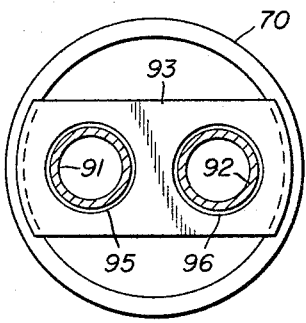
FIG. 19
FIG. 20

April 23, 1968 E. R. ALLER ETAL 3,379,478
RAILWAY CARS FOR TRANSPORTING PULVERULENT MATERIAL LADINGS
Filed Feb. 16, 1966 12 Sheets-Sheet 12
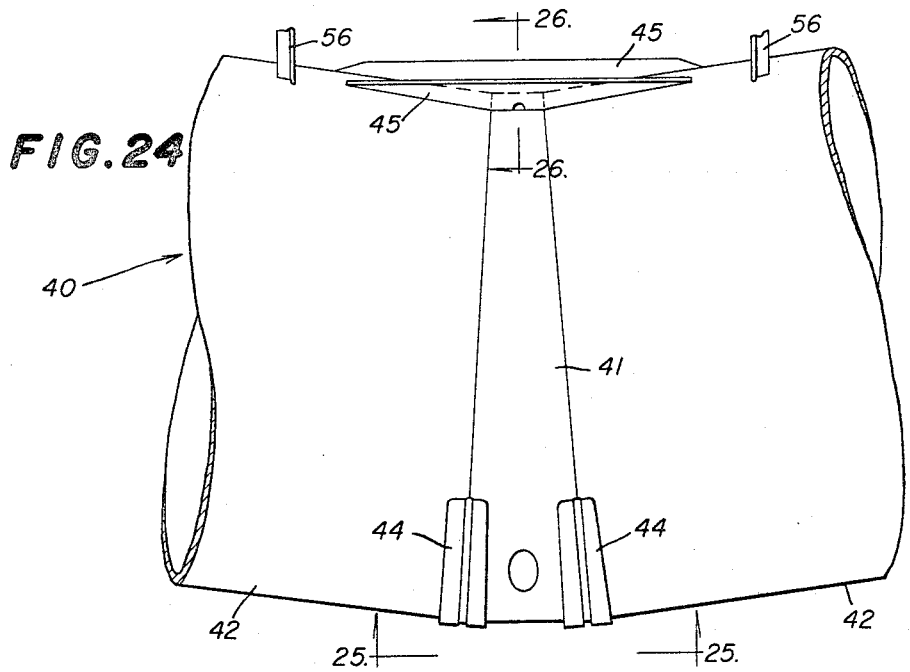
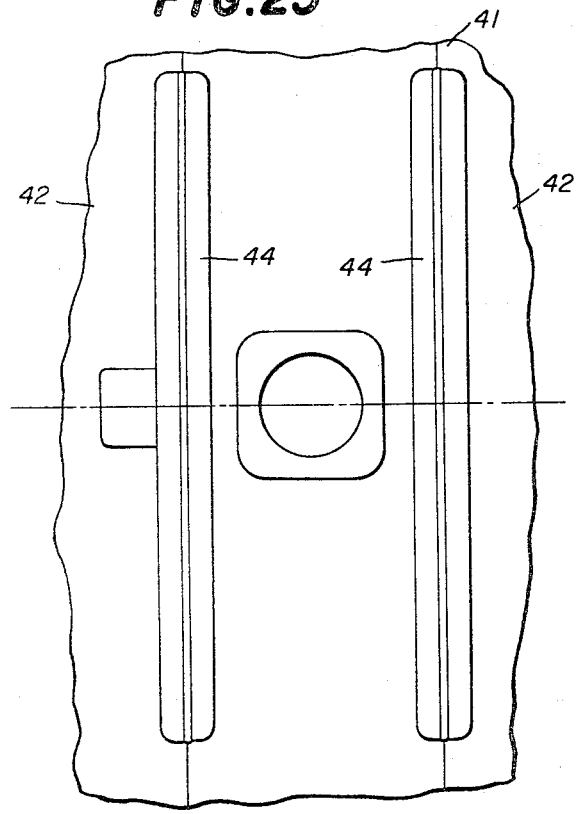
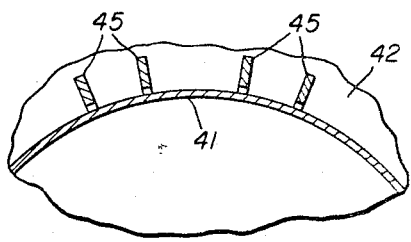

United States Patent Office 3,379,478
Patented Apr. 23, 1968

3,379,478
RAILWAY CARS FOR TRANSPORTING PULVERU-
LENT MATERIAL LADINGS
Edmund R. Aller, Gary, Ind., and Robert F. Loomis,
Allentown, Pa., assignors to General American Trans-
portation Corporation, Chicago, Ill., a corporation of
New York
Filed Feb. 16, 1966, Ser. No. 527,966
29 Claims. (Cl. 302—52)

ABSTRACT OF THE DISCLOSURE

There is disclosed a railway car for transporting pulverulent material ladings, such as cement, including a body shell formed of three cylindrical sections with the two end sections inclined upwardly, stub draft sills connected to the undersides of the end sections so that the body shell carries the draft forces therethrough, aerating and fluidizing structure in the body shell for unloading the lading therefrom, and automatic valve mechanism associated with the unloading structure operable upon loss of air pressure in the body shell to close the material outlet therefrom thus positively to prevent the "bubble" effect and to prevent damage to the receiving bin.

---

The present invention relates to a railway car comprising an elongated longitudinally extending body shell defining a fluid-tight enclosure and adapted to receive a pulverulent material lading, such as cement, cereal flour, etc., and a pneumatic system of improved construction and arrangement for loading and for unloading the pulverulent material with respect to the body.

It is a general object of the invention to provide a railway car of the character noted, wherein the body is of strong rigid construction so that it is capable of withstanding very substantial superatmospheric pressure in order that the pulverulent material therein may be unloaded therefrom by relatively high pressure air introduced thereinto and then conveyed or blown by the high pressure air into a storage bin, or the like, that may be disposed at a very substantial elevation with respect to the railway car.

Another object of the invention is to provide a railway car of the character noted, wherein the loading equipment is of improved pneumatic type so that the pulverulent material may be quickly loaded into the body, without the loss as dust of any substantial part of the material.

Another object of the invention is to provide a railway car of the character noted, wherein the body is of such strong construction that no underframe is required, whereby the total draft and buff forces are transmitted directly through the body between two stub draft sills respectively rigidly secured to the lower surfaces of the opposite ends of the body, the two stub draft sills carrying two draft gears of conventional construction and arrangement.

Another object of the invention is to provide a railway car of the character noted, wherein the unloading equipment is of the pneumatic type that incorporates facility for aerating the pulverulent material in order to effect slide thereof to a sump incorporated in the body and the subsequent pick-up of the pulverulent material in the sump and the discharge thereof to the exterior of the body.

A further object of the invention is to provide a vehicle provided with a body shell adapted to receive a pulverulent material lading and comprising a superatmospheric pneumatic unloading system that includes a valve mechanism that is arranged to be automatically operated into its closed position at the conclusion of the unloading of the pulverulent material from the body, so as to eliminate the usual high-pressure "bubble" effect, at this time, in order positively to prevent damage to the receiving bin, or the like, that frequently occurs at the conclusion of the unloading operation in such pneumatic unloading systems involving substantial superatmospheric pressure air.

A still further object of the invention is to provide a vehicle of the character described, wherein the valve mechanism is arranged to be throttled under manual control, so that the pressure of the air in the pneumatic unloading system may be preset to a safe value related to the strength of the receiving bin, or the like, that is connected to the pneumatic unloading system extending from the body of the vehicle.

A still further object of the invention is to provide a vehicle of the type described, wherein the system for aerating the pulverulent material contained in the vehicle body is of improved construction and arrangement, so that substantially all of the pulverulent material may be readily unloaded from the vehicle body by the pneumatic unloading system, notwithstanding the fact that the vehicle body may have an extremely large volume, at least as large as about 3,000 cu. ft.

Yet another object of the invention is to provide a vehicle of the type described, wherein the pneumatic unloading system incorporated therein is operative in the superatmospheric pressure range including air pressures extending from about 15 p.s.i.g. to about 40 p.s.i.g.

A still further object of the invention is to provide a railway car comprising a body of the type noted and incorporating a pneumatic unloading system of the character described, wherein the unloading of the pulverulent material from the car body may be readily manually controlled from either side of the car body and may take place on either side of the car body.

A further object of the invention is to provide a railway car of the type noted that is of improved and simplified construction and arrangement.

Further features of the invention pertain to the particular arrangement of the elements of the railway car and of the pneumatic loading and unloading systems therefor, whereby the above-outlined and additional operating features thereof are attained.

The invention, both as to its organization and method of operation, together with further objects and advantages thereof will best be understood by reference to the following specification taken in connection with the accompanying drawings, in which:

FIGURE 1 is a side elevational view of a railway car comprising an elongated longitudinally extending body shell defining a fluid-tight enclosure and adapted to receive a pulverulent lading and incorporating pneumatic systems for loading and for unloading the same and embodying the present invention;

FIG. 2 is an end elevational view of the railway car, as shown in FIG. 1;

FIG. 3 is a plan view of the railway car, as shown in FIGS. 1 and 2;

FIG. 4 is an enlarged fragmentary side view of the railway car body, similar to FIG. 1, and illustrating certain interior structural details thereof;

FIG. 5 is an enlarged longitudinal sectional view of the railway car body, this view being taken in the direction of the arrows along the line 5—5 in FIG. 4;

FIG. 6 is a further enlarged fragmentary lateral sectional view of the railway car body, this view being taken in the direction of the arrows along the line 6—6 in FIG. 4;

FIG. 7 is a greatly enlarged fragmentary lateral sectional view of the portion of the railway car body shown in the area 7 in FIG. 6;

FIG. 8 is a greatly enlarged fragmentary plan view of the portion of the railway car body shown in the area 8 in FIG. 5;

FIG. 9 is a greatly enlarged fragmentary longitudinal sectional view of the railway car body, this view being taken in the direction of the arrows along the line 9—9 in FIG. 8;

FIG. 10 is a greatly enlarged fragmentary lateral sectional view of the railway car body, this view being taken in the direction of the arrows along the line 10—10 in FIG. 9;

FIG. 11 is a greatly enlarged fragmentary lateral sectional view of the railway car body, this view being taken in the direction of the arrows along the line 11—11 in FIG. 1;

FIG. 12 is a fragmentary schematic illustration of the portion of the pneumatic system, as shown in FIG. 11;

FIG. 13 is a greatly enlarged fragmentary longitudinal sectional view of the railway car body, this view being taken in the direction of the arrows along the line 13—13 in FIG. 11;

FIG. 14 is a greatly enlarged fragmentary longitudinal sectional view of the railway car body, this view being taken in the direction of the arrows along the line 14—14 in FIG. 13;

FIG. 15 is a greatly enlarged fragmentary lateral sectional view of the central portion of the railway car body, as shown in FIGS. 11 and 13;

FIG. 16 is a greatly enlarged longitudinal sectional view of valve mechanism forming a part of the pneumatic system incorporated in the railway car body, this view being taken in the direction of the arrows along the line 16—16 in FIG. 13;

FIG. 19 is a greatly enlarged longitudinal sectional view of the central dome section of the railway car body, this view being taken in the direction of the arrows along the line 19—19 in FIG. 15;

FIG. 20 is a greatly enlarged sectional view of the central dome section of the railway car body, this view being taken in the direction of the arrows along the line 20—20 in FIG. 19;

FIG. 24 is an enlarged fragmentary side elevational view of the central portion of the railway car body, as shown in FIG. 1;

FIG. 25 is a fragmentary bottom view of the central portion of the railway car body, this view being taken in the direction of the arrows along the line 25—25 in FIG. 24; and FIG. 26 is an enlarged fragmentary lateral sectional view of the central top portion of the railway car body, this view being taken in the direction of the arrows along the line 26—26 in FIG. 24.

Figure 17:
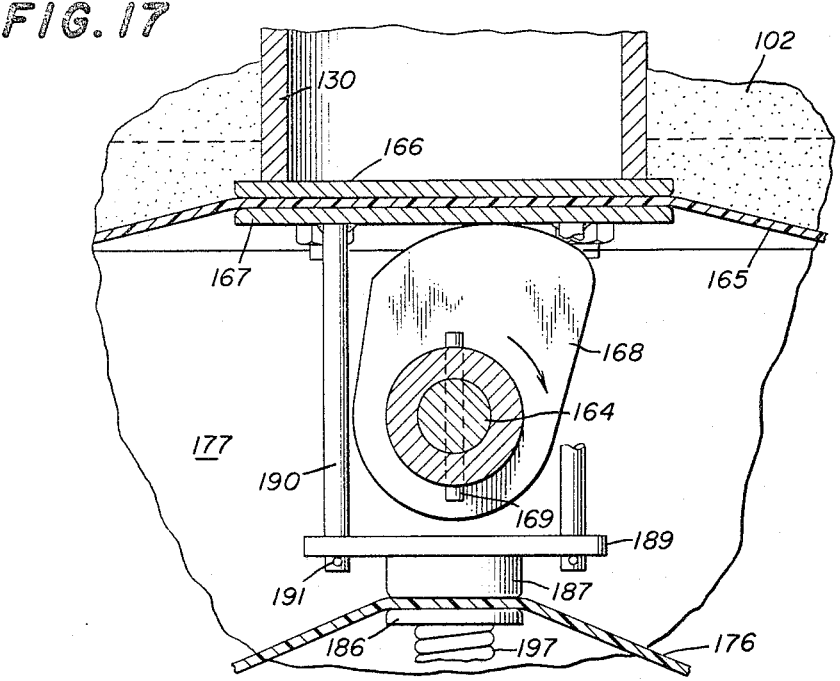
FIG. 17 is a greatly enlarged fragmentary lateral sectional view of the valve mechanism, this view being taken in the direction of the arrows along the line 17—17 in FIG. 16.

Referring now to FIGS. 1 to 3, inclusive, of the drawings, there is illustrated a vehicle in the form of a railway car 30 that comprises an elongated longitudinally extending body shell 40 defining a fluid-tight enclosure and adapted to receive a pulverulent material lading, such as cement, cereal flour, etc., and embodying the features of the present invention; which body shell 40 is of strong rigid self-supporting construction, including a short substantially cylindrical central section 41 and a pair of substantially cylindrical end sections 42 and a pair of end headers 43. The end sections 42 are respectively arranged at the opposite ends of the central section 41 and the end headers 43 are respectively arranged at the opposite ends of the end sections 42. The outer ends of the central section 41 are respectively rigidly secured, as by welding, to the adjacent inner ends of the end sections 42; and the outer ends of the end sections 42 are respectively rigidly secured, as by welding, to the adjacent inner open ends of the end headers 43. The longitudinal center lines 42' of the two end sections 42 respectively extend upwardly and longitudinally outwardly from the substantially horizontal longitudinal center line 41' of the central section 41 at an angle of about 8°; whereby the opposite ends of the lading compartment defined within the body shell 40 extend upwardly and longitudinally outwardly from the central section thereof, as best illustrated in FIG. 1; whereby the body shell 40 has what may be termed a "sway-back" configuration.

Referring now to FIGS. 1 to 3, inclusive, and 24 to 26, inclusive, the central portion of the body shell 40 is especially reinforced at the bottom thereof by a pair of semicircular strips 44 respectively positioned at the junctions of the central section 41 with the end sections 42, the strips 44 respectively embracing the adjacent portions of the sections 41 and 42 and being rigidly secured in place, as by welding. The central portion of the body shell 40 is especially reinforced at the top thereof by a plurality of longitudinally extending and circumferentially spaced-apart braces 45 bridging the top of the central section 41 and the adjacent top inner ends of the end sections 42; which braces 45 are of strong rigid construction and are rigidly secured in place to the adjacent portions of the sections 41 and 42, as by welding. The arrangement of the elements 44 and 45 prevent undue strain out of position of the central section 41 of the body shell 40, when the lading compartment defined therein is filled with the pulverulent material that is hereinafter referred to, as a matter of convenience, as cement.

A pair of short stiff stub draft sills 50 are respectively arranged below the central outer end portions of the end sections 42 and disposed in longitudinal alignment with each other and respectively rigidly secured in place, so that the total draft and buff forces that are applied between the stub draft sills 50 are transmitted directly through the body shell 40, and without the provision of an underframe in the railway car 30. The construction and arrangement of the stub draft sill 50 will best be understood by reference to FIGS. 1 and 21 to 23, inclusive; whereby it is illustrated that the pair of stub draft sills 50 are rigidly secured in place by respective structures, each including a saddle plate 51, a body bolster 52, and an intervening pedestal 53. Specifically, the saddle plate 51 is semi-cylindrical and is arranged in direct engagement and embracing relation with the outer end portion of the adjacent end section 42 and rigidly secured in place, as by welding; and the inner end of the stub draft sill 50 is disposed in engagement with the adjacent saddle plate 51 and rigidly secured thereto, as by welding. The body bolster 52 is disposed below the stub draft sill 50 and extends laterally on either side thereof and is rigidly secured thereto, as by welding; and the pedestal 53 is arranged between the saddle plate 51 and the body bolster 52 and rigidly secured thereto, as by welding. Thus, it will be understood that the inner end of the stub draft sill 50, the adjacent saddle plate 51, the adjacent body bolster 52, and the adjacent pedestal 53 comprise a unitary rigid fabricated construction that is, in turn, rigidly secured to the adjacent outer end portion of the adjacent end section 42. The outer end of the stub draft sill 50 is hollow and receives the usual draft gear, not shown; and the body bolster 52 is arranged to receive the usual center pin, not shown, for the purpose of accommodating the usual articulated connection of the body bolster 52 to the truck bolster of the adjacent truck, not shown; whereby the opposite ends of the body shell 40 are supported through the respectively adjacent pair of body bolsters 52 by the respectively adjacent pair of trucks, in the usual manner.

Continuing the reference to FIGS. 1, 2 and 3, the opposite end headers 43 respectively carry a pair of upstanding ladders 54. Each of the ladders 54 extends from the adjacent stub draft sill 50 to the top of the adjacent end header 43; and an elongated longitudinally extending catwalk 55 is arranged on the top central portion of the body shell 40. The opposite ends of the catwalk 55 respectively terminate adjacent to the tops of the two ladders 54, so as to accommodate the passage of a trainman from end-to-end of the railway car 30 in a convenient manner. The intermediate portions of the catwalk 55 may be suitably supported upon the adjacent upper portions of the end sections 42 employing brackets 56 extending therebetween, as best illustrated in FIGS. 1 and 24. The catwalk 55 may be of any suitable construction, and as illustrated is formed of open-grating structure.

A pair of pneumatic loading nozzles 60 are respectively carried by the end headers 43 and arranged on opposite sides of the catwalk 55, as best shown in FIGS. 1 to 3, inclusive. Each of the loading nozzles 60 is disposed adjacent to the top of the adjacent end header 43 and communicates with the adjacent upper end portion of the lading compartment defined within the body shell 40; and each of the loading nozzles 60 is provided with a removable cap 61 that is normally arranged in fluid-tight closing relation therewith. Also, a pair of manway structures 62 are respectively carried by the end sections 42 and arranged on opposite sides of the catwalk 55. Each of the manway structures 62 is disposed adjacent to the top of the adjacent end section 42 and near the adjacent end header 43 and communicating with the adjacent top end portion of the lading compartment defined within the body shell 40; and each of the manway structures 62 is provided with a removable cover 63 that is normally arranged in fluid-tight closing relation therewith. Further, as best shown in FIGS. 1 and 3, each of the manway structures 62 is positioned on the same side of the catwalk 55 as is the adjacent loading nozzle 60 and slightly out of longitudinal alignment therewith, each manway structure 62 being disposed somewhat laterally outwardly from the adjacent loading nozzle 60.

Referring now to FIGS. 1, 19 and 20, the top portion of the central section 41 carries an upstanding cylindrical dome structure 70 of tube-like form that is secured in place by an associated ring 71, the ring 71 being disposed in surrounding relation with the lower end of the tube 70 and rigidly secured thereto and to the top of the central section 41, as by welding. The top end of the tube 70 is closed by a washer-like ring 72 that is rigidly secured in place, as by welding; and the top of the ring 72 removably carries a pressure-relief valve 73 that is provided with a casing 74 carrying an annular flange 75. The flange 75 is directly secured to the ring 72 by a plurality of bolts 76, with an annular gasket 77 therebetween, so as to provide a fluid-tight joint between the top of the tube 70 and the casing 74. The valve 73 may be removed from closing relation with the ring 72, when desired, by removal of the bolts 76; and in order to prevent loss of the valve 73, the casing 74 is chained to the upper portion of the tube 70 by a link chain, indicated at 78. One end of the chain 78 is affixed to a ring 79 that is fixed to the upper end of the tube 70; and the other end of the chain 78 is affixed to a ring 80 arranged about the casing 74. The upper end of the casing 74 is closed by a diaphragm 81 that is clamped in place by a cap 82 that is secured to the top of the casing 74 by a bolt 83, carrying a nut 84, the bolt 83 projecting through a hole formed in a lug 85 formed integral with the top of the casing 74. The interior of the cap 82 communicates with the atmosphere via a passage 86 formed therein; and the inner end of the passage 86 communicates with the top surface of the diaphragm 81. Thus, in the abnormal event of an exceedingly high pressure of the air within the lading compartment defined in the body shell 40, the same communicating with the interior of the tube 70 effects rupture of the diaphragm 81, with the consequent escape of the air through the passage 86 in the cap 82 to the atmosphere, and with the consequent relief of the high pressure of the air in the lading compartment defined in the body shell 40.

In the event of such rupture of the diaphragm 81, the bolt 83 may be loosened with respect to the nut 84, so that the cap 82 may be elevated and rotated out of the way with respect to the top of the casing 74. The ruptured diaphragm 81 may then be removed from the top end of the casing 74; and a new imperforate diaphragm 81 may then be substituted for the ruptured diaphragm 81 in the top end of the casing 74. Thereafter, the cap 82 is rotated back into its normal position covering the diaphragm 81. Subsequently, the bolt 83 is tightened with respect to the nut 84 causing the cap 82 to clamp the diaphragm 81 in place in closing relation with the top of the casing 74. This conventional type of pressure relief valve 73 is very advantageous, as the same requires the attention of an operator following a rupture of the diaphragm 81 and before the lading compartment defined in the body shell 40 may again be subjected to relatively high air pressure; whereby the operator may, incident to replacement of the diaphragm 81, inspect the other elements of the pressure system, as described fully hereinafter.

Continuing the reference to FIGS. 19 and 20, the interior of the tube 70 houses the top open ends of two jet pipes 91 and 92 that are employed in unloading the cement from the lading compartment, as explained more fully hereinafter; which jet pipes 91 and 92 are located by an associated strap 93 secured in place at the lower end of the tube 70. The strap 93 extends across the lower end of the tube 70 and is arranged within the top central portion of the lading compartment. Specifically, the strap 93 carries a pair of longitudinally spaced-apart ferrules 95 and 96 respectively surrounding the adjacent outer end portions of the jet pipes 91 and 92 and effecting the desired location of the top open ends of the jet pipes 91 and 92 within the tube 70 and well below the pressure-relief valve 73 carried by the top of the tube 70.

Referring now to FIGS. 4 to 10, inclusive, the lower central portion of the central section 41 has an opening therein in which a supporting ring 101 is rigidly secured in place, as by welding; and the lower interior of the body shell 40 carries a number of structures described below that produce a sump 102 in the bottom central portion of the lading compartment defined within the body shell 40 that is disposed immediately above the ring 101 and directly communicating with the opening provided through the ring 101, as best shown in FIGS. 8 to 10, inclusive. A pair of elongated longitudinally extending and laterally spaced-apart structures 103 and 104, referred to as "footings," are provided in the lower portion of the body shell 40 on opposite sides of the ring 101; which footings 103 and 104 respectively define air chambers 105 and 106 therebelow. A pair of elongated longitudinally extending and aligned structures 107 and 108, referred to as "crickets," are respectively disposed in the central bottom portions of the end sections 42 and are respectively positioned at the opposite ends of the ring 101, the inner ends of the crickets 107 and 108 being arranged in longitudinally spaced-apart relation at opposite ends of the sump 102. The two crickets 107 and 108 are directly supported upon the adjacent inner portions of the two footings 103 and 104; and the two crickets 107 and 108 respectively define air chambers 109 and 110 therebelow that commonly communicate with the air chambers 105 and 106. Also, a pair of elongated longitudinally extending and laterally spaced-apart structures 111 and 112, referred to as "slope sheets," are arranged in the lower portion of the body shell 40 and positioned on the outer sides of the respective footings 103 and 104; which slope sheets 111 and 112 respectively define air chambers 113 and 114 therebelow that respectively communicate with the adjacent air chambers 105 and 106. Thus the air chambers 105, 106, 109, 110, 113 and 114 commonly communicate with each other and constitute a common plenum chamber for a purpose more fully explained below. As best shown in FIGS. 7 and 8, the top surfaces of the footings 103 and 104 have a great plurality of holes 115 and 116 respectively formed therethrough; whereby the air chambers 105 and 106 communicate with the lading chamber disposed thereabove via the respective holes 115 and 116. Two elongated longitudinally extending sheets 117 and 118 of porous fabric are respectively carried by the top surfaces of the respective footings 103 and 104 and in covering relation with the respective sets of holes 115 and 116, thereby to prevent the cement contained in the body shell 40 from falling through the holes 115 and 116 into the respective air chambers 105 and 106, and to serve another purpose more fully developed hereinafter.

In view of the foregoing, it will be understood that the cricket 107 cooperates with the slope sheets 111 and 112 to define two laterally spaced-apart troughs disposed on the left-hand side of the sump 102, as viewed in FIG. 5, that slope both laterally inwardly from the respective slope sheets 111 and 112 and longitudinally downwardly toward the sump 102. Similarly, the cricket 108 cooperates with the slope sheets 111 and 112 to define two additional laterally spaced-apart troughs disposed on the right-hand side of the sump 102, as viewed in FIG. 5, that slope both laterally inwardly from the respective slope sheets 111 and 112 and longitudinally downwardly toward the sump 102.

As best shown in FIG. 4, a high pressure air supply nozzle 120 is carried by the right-hand end section 42 adjacent to the bottom thereof and somewhat longitudinally displaced toward the right from the ring 101; whereby air under relatively high pressure and normally in the range 15 p.s.i.g. to 40 p.s.i.g. may be supplied directly into the air chamber 110, and thus into the interconnected air chambers 105, 106, 109, 110, 113 and 114, and consequently below the crickets 107 and 108 and below and behind the slope sheets 111 and 112. The air thus supplied into the air chambers 105 and 106 proceeds through the holes 115 and 116 and thence through the fabrics 117 and 118 into the previously mentioned four troughs and thus into the lading compartment defined in the body shell 40. The passage of the air through the fabrics 117 and 118 effects aeration or fluidization of the adjacent portions of the cement in the four troughs mentioned and the consequent fluid flow of the cement downwardly in the four troughs mentioned into the sump 102; and from the sump 102 the cement is conveyed to the exterior of the body shell 40, as explained more fully below. Since the air chambers 105, 106, 109, 110, 113 and 114 are in open communication with each other and constitute a common plenum chamber, there is always ample air under relative high pressure in the common plenum chamber for the purpose of fluidizing the cement contained in the lading compartment. Moreover, since there is only a relatively small pressure drop or gradient between the common plenum chamber and the lading compartment defined in the body shell 40, the elements 107, 108, 111 and 112 are subjected only to this small pressure differential; with the result that the relatively high air pressures in the common plenum chamber and in the lading compartment produce no substantial strain or deformation of the elements 107, 108, 111 and 112 incident to unloading of the cement from the lading compartment, as explained more fully below. Also, the relatively high air pressures effect no substantial strain or deformation of the body shell 40 due to the general cylindrical configuration thereof at all lateral cross sections thereof throughout the length thereof.

Referring now to FIGS. 11 to 16, inclusive, the central section 41 carries a laterally extending unloading tube 125 that projects through the lower portion thereof and that is supported adjacent to the opposite ends thereof by two laterally spaced-apart and aligned ferrules 126 and 127 respectively mounted in openings respectively provided in the opposite bottom sides of the central section 41. The two ferrules 126 and 127 are respectively rigidly secured in place in the two openings respectively provided in the opposite bottom sides of the central section 41, as by welding; and the tube 125 is suitably secured in place in the two ferrules 126 and 127; and the opposite outer ends of the tube 125 are arranged exteriorly of the body shell 40 and respectively adjacent to the opposite sides of the central section 41. The opposite outer ends of the tube 125 are open and respectively carry a pair of removable caps 128 of conventional construction, each cap 128 being attached to the adjacent end portion of the tube 125 by an associated link chain 129 to prevent loss of the cap 128. The midportion of the tube 125 communicates with a depending conduit 130 that projects downwardly into the sump 102. In view of the foregoing, it will be understood that the cement in the sump 102 may be conveyed via the conduit 130 into the tube 125 and then blown through the tube 125 in either direction therethrough to the exterior, with the corresponding one of the caps 128 removed from the adjacent one end of the tube 125, all for the unloading purpose, explained more fully hereinafter.

The two jet pipes 91 and 92 are respectively connected to two blow pipes 131 and 132 that extend downwardly and laterally outwardly through two supporting ferrules 133 and 134 to the exterior of the body shell 40. Specifically the ferrule 133 is rigidly secured in place, as by welding, into aligned holes respectively provided in the adjacent central section 41 and in the adjacent slope sheet 111; and the blow pipe 131 is suitably secured in place in the ferrule 133. Similarly, the ferrule 134 is rigidly secured in place, as by welding, into aligned holes respectively provided in the adjacent central section 41 and in the adjacent slope sheet 112; and the blow pipe 132 is suitably secured in place in the ferrule 134. The outer ends of the blow pipes 131 and 132 respectively terminate in two fixtures 135 and 136 arranged exteriorly of the body shell 40 that are respectively connected to two valves 137 and 138 of the butterfly type. In turn, the valves 137 and 138 are respectively connected by two pipes 139 and 140 to two fixtures 141 and 142 that respectively communicate with the opposite ends of the tube 125 exteriorly of the central section 41 and respectively laterally inwardly of the adjacent caps 128.

Referring now to FIGS. 11, 13 and 14, it is noted that two manually operated levers 143 and 144 are respectively arranged on opposite sides of the central section 41 and are respectively operatively connected to the valves 137 and 138 for the purpose of selectively operating these valves between their open and closed positions. Specifically, the lever 143 is pivotally mounted upon an associated bracket 145 that is rigidly secured to the adjacent portion of the central section 41 and is operatively connected to an associated rod 146. Similarly, the lever 144 is pivotally mounted upon an associated bracket 147 that is rigidly secured to the adjacent portion of the central section 41 and is operatively connected to an associated rod 148. The rod 146 is operatively connected to a bell crank 149 that is pivotally supported adjacent to the bottom of the central section 41, as explained more fully hereinafter; the bell crank 149 is operatively connected to a rod 150 that is, in turn, operatively connected to a rotatably mounted operating shaft 151 of the valve element of the butterfly valve 137. Similarly, the rod 148 is operatively connected to a bell crank 152 that is pivotally supported adjacent to the bottom central section 41, as explained more fully hereinafter; the bell crank 152 is operatively connected to a rod 153 that is, in turn, operatively connected to the rotatably mounted operating shaft 154 of the valve element of the butterfly valve 138. In view of the foregoing, it will be understood that the butterfly valve 137 on one side of the central section 41 may be selectively operated between its open and closed positions by correspondingly operating the manual lever 143 from the other side of the central section 41 and that the butterfly valve 138 on the other side of the central section 41 may be selectively operated between its open and closed positions by correspondingly operating the manual lever 144 from the one side of the central section 41.

More particularly, when the cement is to be unloaded from the left-hand side of the tube 125, as viewed in FIGS. 13 and 15, the adjacent cap 128 is removed from the corresponding outer left-hand end of the tube 125 and the lever 143 is operated to effect opening of the butterfly valve 137, with the result that high pressure air from the jet pipe 91 is conducted via the blow pipe 131 and through the valve 137 in its open position into the adjacent right-hand end of the tube 125; whereby the air is blown from right to left through the tube 125 and out of the adjacent open left-hand end thereof, so as to effect unloading of the cement through the open left-hand end of the tube 125 to the exterior. On the other hand, when the cement is to be unloaded from the right-hand side of the tube 125, as viewed in FIGS. 13 and 15, the adjacent cap 128 is removed from the corresponding outer right-hand end of the tube 125 and the lever 144 is operated to effect opening of the butterfly valve 138, with the result that the high pressure air from the jet pipe 92 is conducted via the blow pipe 132 and through the valve 138 in its open position into the adjacent left-hand end of the tube 125; whereby the air is blown from left to right through the tube 125 and out of the adjacent open right-hand end thereof, so as to effect unloading of the cement through the open right-hand end of the tube 125 to the exterior.

Figure 18:
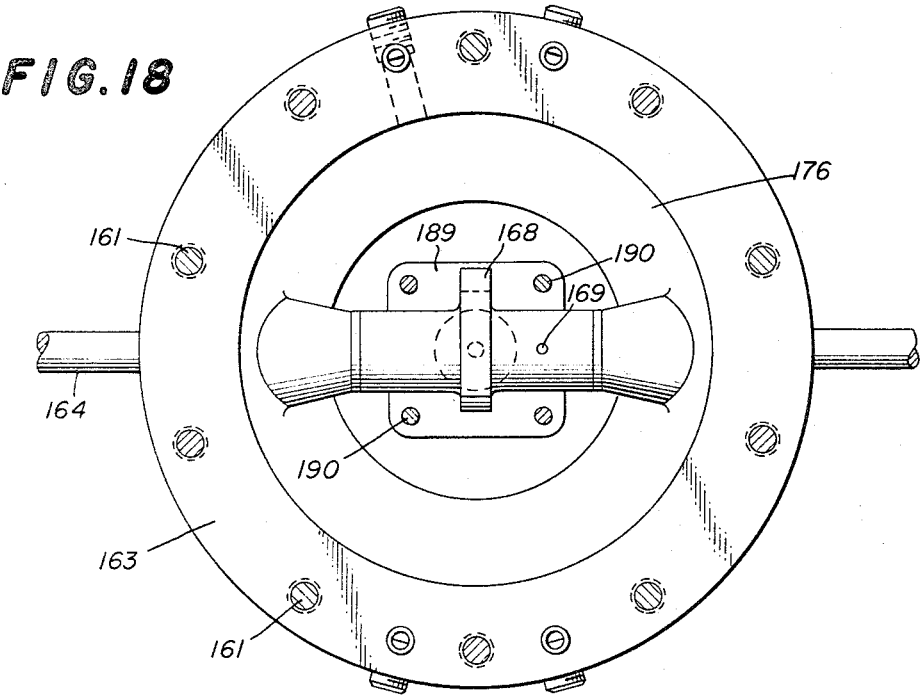
FIG. 18 is a greatly enlarged plan view of the valve mechanism, this view being taken in the direction of the arrows along the line 18—18 in FIG. 16.
Figure 21:
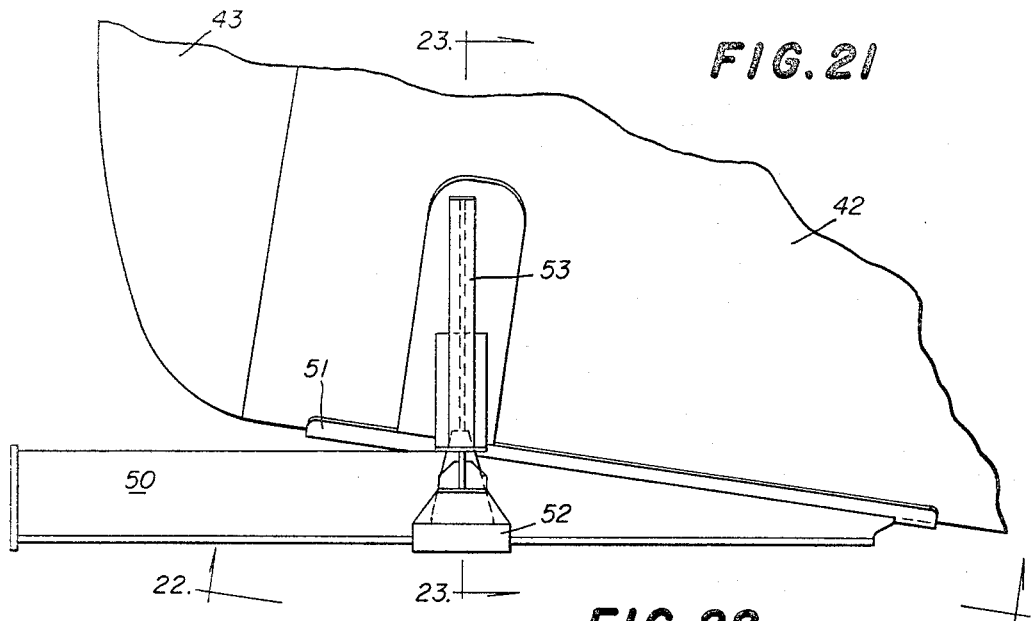
FIG. 21 is an enlarged fragmentary side elevational view of one of the end portions of the railway car body as shown in FIG. 1.
Figure 22:
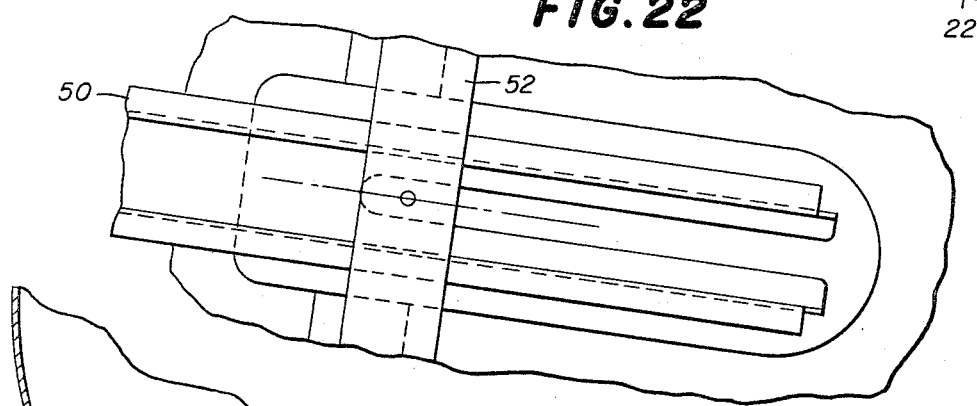
FIG. 22 is an enlarged fragmentary bottom view of the end portion of the railway car body, this view being taken in the direction of the arrows along the line 22—22 in FIG. 21.
Figure 23:
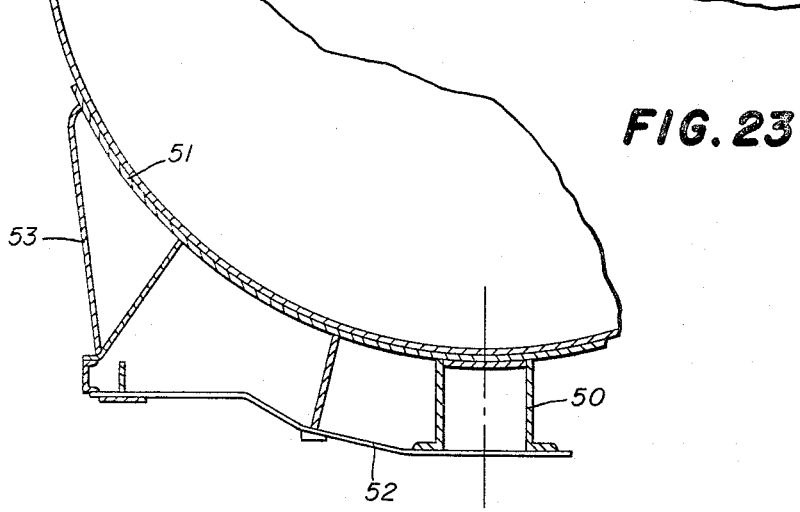
FIG. 23 is an enlarged fragmentary lateral sectional view of the end portion of the railway car body, this view being taken in the direction of the arrows of the line 23—23 in FIG. 21.

Referring now to FIGS. 11, 13, 14 and 16, the valve mechanism 160 is detachably secured to the bottom of the ring 101 by a series of bolts 161 provided with cooperating units 162; which valve mechanism 160 comprises a casing 163 carrying a longitudinally extending and rotatably mounted operating shaft 164 projecting from the opposite ends thereof. The opposite ends of the operating shaft 164 respectively pivotally mount and support the previously mentioned bell cranks 149 and 152, as shown in FIGS. 11 and 13. Also, the valve mechanism 160 comprises, as best shown in FIGS. 16 to 18, inclusive, a flexible diaphragm 165 that is secured in place between the bottom surface of the ring 101 and the adjacent top surface of the casing 163; which diaphragm 165 may be formed of a suitable plastic sheet material, such as neoprene. The central portion of the diaphragm 165 carries an upper valve element or plate 166 that cooperates with the adjacent open end of the conduit 130, and a lower work plate 167 that cooperates with a cam 168 that is rigidly secured to the midportion of the operating shaft 165 by a cooperating pin 169. The two plates 166 and 167 are secured together with the central portion of the diaphragm 165 clamped therebetween by a series of screws 170 provided with cooperating nuts 171. The casing 163 terminates in a downwardly projecting substantially tubular section 172 to which there is secured an annular flange 173 provided on a downwardly extending substantially cup-shaped casing 174, the flange 173 being secured to the adjacent end of the tubular section 172 by a series of bolts 175. A flexible diaphragm 176 is secured in place between the bottom surface of the tubular section 172 and the adjacent top surface of the annular flange 173; which diaphragm 176 may be formed of a suitable plastic sheet material, such as neoprene. Accordingly, the operating shaft 164 extends through the casing 163 and between the two vertically spaced-apart diaphragms 165 and 176; the two diaphragms 165 and 176 are imperforate and cooperate with each other to define an air chamber 177 within the casing 163 and in which the cam 168 is housed. The air chamber 177 communicates with the air chamber 109 defined in the cricket 107 via a snorkel tube 178 arranged in a threaded opening 179 provided in the ring 101 and communicating with a passage 180 formed in the casing 163. The air chamber 177 also communicates with the air chamber 110 defined in the cricket 108 via a snorkel tube 181 arranged in a threaded opening 182 provided in the ring 101 and communicating with a passage 183 formed in the casing 163. Accordingly, the air chamber 177 is subjected to the air pressure in the chambers 109 and 110, for a purpose more fully explained hereinafter. Further, it will be observed that the upper surface of the diaphragm 165 is subjected to the air pressure in the sump 102, while the lower surface of the diaphragm 165 is subjected to the air pressure in the air chamber 177. The cup-shaped casing 174 cooperates with the diaphragm 176 to define an air chamber 184 therebetween which air chamber 184 communicates with the atmosphere via a plurality of passages 185 formed in the casing 174; whereby the air chamber 184 contains air at atmospheric pressure and subjects thereto the lower surface of the diaphragm 176.

The central portion of the diaphragm 176 is clamped between a bushing 186 arranged within the air chamber 184 and a nut 187 arranged in the air chamber 177 by a cooperating bolt 188. The head of the bolt 188 is arranged in the air chamber 184 and the shank thereof extends first through the bushing 186 and is then threaded into the opening provided in the nut 187. A plate 189 is arranged in the air chamber 177 and rigidly secured to the top surface of the nut 187; and the workplate 167 is operatively connected to the plate 189 disposed directly therebelow by a plurality of studs 190 extending therebetween, four of the studs 190 being illustrated. In the arrangement, the upper end of each of the studs 190 is rigidly secured to the workplate 167 and the lower end thereof extends through a cooperating hole provided in the plate 189 and is slidable in the hole mentioned. The extreme lower end of each of the studs 190 carries a pin 191 to prevent upward movement of the stud 190 with the workplate 167 and out of the cooperating hole provided in the plate 189. This connection of the workplate 167 to the plate 189 by the studs 190 accommodates relative movement of the workplate 167 downwardly with respect to the plate 189 and insures that extreme downward movement of the plate 189 is transmitted via the studs 190 to the workplate 167; whereby this connection, including the studs 190, constitutes a lost motion connection between the plate 189 and the workplate 167, for a purpose more fully explained hereinafter.

The central bottom of the cup-like casing 174 has a hole 192 therein that is covered by a cooperating plate 193; which plate 193 carries a bolt 194. The head of the bolt 194 is accessible from the exterior below the plate 193 and the shank of the bolt 194 extends through the hole 192 into the air chamber 184. The upper end of the shank of the bolt 194 carries a cooperating nut 195; and the lower portion of the bushing 186 carries a sleeve 196; which nut 195 and sleeve 196 are arranged in vertical alignment and operatively interconnected by a tension coil spring 197 extending therebetween. Specifically, the lower end of the tension spring 197 is rigidly secured to the nut 195 and the upper end of the tension spring 197 is rigidly secured to the sleeve 196. Accordingly, it will be understood that the tension spring 197 exerts a downward pull upon the sleeve 196 and thus upon the elements 186, 187 and 189, as clearly shown in FIG. 16. The downward pull upon the plate 189 is transmitted via the studs 190 to the workplate 167 so as to bias the workplate 167 into riding engagement with the cam 168 rigidly connected to the operating shaft 164. Also, the downward bias of the workplate 167 is exerted via the screws 170 upon the valve element 166 so as to bias the valve element 166 into open position with respect to the open end of the conduit 130. In the arrangement, the operating shaft 164 occupies a normal rotary position so as to cause the cam 168 to act upon the workplate 167 so as to force the valve element 166 into its closed position with respect to the open end of the conduit 130 against the bias of the tension spring 197 and as shown in FIG. 17. Also, it will be understood that the downward bias of the tension spring 197 that is exerted upon the plate 189 and via the element 190, 167 and 170 upon the valve element 166 may be selectively adjusted by selective rotation of the head of the bolt 194 with respect to the plate 193, in an obvious manner and for a purpose more fully explained hereinafter.

Again referring to FIGS. 11, 13 and 14, there is provided a worm gear mechanism 200 for the purpose of selectively rotating the operating shaft 164. Specifically, the mechanism 200 comprises a casing 201 that is operatively supported by one of the end sections 42 immediately adjacent to the central section 41 by a bracket 202, as best shown in FIG. 14. Also, the mechanism 200 comprises two drive shafts that are respectively connected by two connectors 202 and 203 to two control rods 204 and 205 extending laterally toward the opposite sides of the bottom of the body shell 40 and respectively mounted for rotation by two brackets 206 and 207 respectively carried by the opposite lower portions of the adjacent end section 42. The extreme outer ends of the control rods 204 and 205 respectively terminate in hand wheels 208 and 209 respectively located adjacent to the opposite bottom sides of the adjacent end section 42 and respectively positioned in the general vicinity of the respective hand levers 144 and 143. Further, the mechanism 200 comprises a driven shaft that is operatively connected by a connector 210 to the adjacent end of the operating shaft 164 of the valve mechanism 160. Accordingly, it will be understood: manual rotation of the handwheel 208 effects corresponding rotation of the control rod 204 and the consequent operation of the mechanism 200 to effect corresponding rotation of the operating shaft 164 of the valve mechanism 160; manual rotation of the handwheel 209 effects corresponding rotation of the control rod 205 and the consequent operation of the mechanism 200 to effect corresponding rotation of the operating shaft 164 of the valve mechanism 60; whereby it will be appreciated that the valve mechanism 160 may be selectively operated from either side of the body shell 40 employing the corresponding ones of the handwheels 208 and 209. As previously mentioned, the handwheels 208 and 209 are located conveniently to the respective hand levers 144 and 142, since the handwheel 208 is operated in conjunction with the manual lever 144 to effect unloading of the cement from one side of the body shell 40 and the handwheel 209 is operated in conjunction with the manual lever 143 to effect unloading of the cement from the other side of the body shell 40.

Considering now the general mode of loading the body shell 40 with the cement, it is first noted that the valve mechanism 160 is operated into its closed position, and likewise the butterfly valves 137 and 138 are operated into their closed position; and at this time, it may be assumed that the body shell 40 is empty and is to be loaded with the cement from the left-hand end thereof, as viewed in FIGS. 1 and 3. In this event, the cap 61 on the loading nozzle 60 at the left-hand end of the body shell 40 is removed and likewise the cover 63 on the adjacent manway 62 is removed, the cap 61 on the loading nozzle 60 at the right-hand end of the body shell 40 being retained in place and the cover 63 on the adjacent manway 62 being retained in place; whereby at this time, the lading chamber in the body shell 40 is subjected to atmospheric pressure. The loading nozzle at the left-hand end of the body shell 40 is then connected to the pneumatic loading system so that air under pressure carrying suspended cement therein is blown into the loading nozzle 60 at the left-hand end of the body shell 40; whereby the current of air proceeds toward the right through the lading compartment toward the right-hand end of the body shell 40. In this passage of the air stream toward the right through the lading compartment, most of the cement is dropped therefrom and prior to the impingement thereof upon the right-hand end header 43. The right-hand end header 43 then redirects the air stream back toward the left-hand end header 43 and thus toward the adjacent open manway 62. With the repassage of the air stream back toward the left through the lading compartment, substantially all of the remainder of the cement is dropped therefrom; with the result that as the air leaves the body shell 40 via the open left-hand manway 62, substantially no cement dust is carried thereby to the exterior. In order to insure this result that no cement dust is blown to the exterior, the usual filter may be placed in the open end of the left-hand manway 62 so as positively to prevent the passage of cement dust to the exterior. After the loading of the body shell 40, the pneumatic loading system is disconnected from the loading nozzle 60 at the left-hand end header 43 and the cap 61 is replaced upon this loading nozzle 60. Also the cover 63 is replaced upon the adjacent left-hand manway 62.

In view of the foregoing, it will be understood that the loading of the body shell 40 with the cement from the right-hand end thereof is accomplished in a similar manner, with the removal of the cap 61 from the loading nozzle 60 at the right-hand end header 43 and with the removal of the cover 63 from the right-hand manway 62, all as viewed in FIGS. 1 and 3. Of course, after the body shell 40 has been loaded with the cement, the cap 61 is replaced upon the loading nozzle 60 at the right-hand end header 43 and the cover 63 is replaced upon the adjacent right-hand manway 62.

When the cement is thus loaded in the body shell 40, the lading compartment is filled with the cement and of course the weight of the cement rests fundamentally upon the slope sheets 111 and 112, the crickets 107 and 108 and the fabrics 117 and 118 respectively carried by the footings 103 and 104. Of course some of the weight of the cement is carried by the diaphragm 165 of the valve mechanism 160 with the valve element 166 in its closed position with respect to the adjacent open end of the conduit 130. Of course, at this time, the caps 128 are secured in place at the opposite ends of the tube 125, whereby the interior of the body shell 40 is subjected to atmospheric pressure and the lading compartment defined in the body shell 40 is completely closed against the admission of moisture thereinto and consequently into the cement that is contained in the lading compartment. Of course, the high pressure air nozzle 120 is closed by a suitable cap, not shown, provided therefor; whereby the railway car 30 is transported to its destination in the usual manner.

Considering now the unloading of the cement from the lading compartment defined in the body shell 40, it is first noted that such unloading may take place from either side of the body shell 40, since the valve mechanism 160 may be selectively operated from either side of the body shell 40 employing the adjacent handwheel 208 or 209, and the butterfly valves 137 and 138 may be respectively selectively operated employing the hand levers 143 and 144. In either case, the high pressure air supply system is connected to the high pressure air nozzle 120 after the removal of the cap therefrom. The cap 128 on the required end of the tube 125 is removed and this end of the tube 125 is connected via the pneumatic unloading equipment to the receiving bin; and it may be assumed that the cement is to be unloaded from the right-hand side of the body shell 40, as viewed in FIG. 11. The handwheel 208 is operated to effect the desired opening of the valve mechanism 160. Specifically, proper operation of the handwheel 208 causes the operating shaft 164 to be rotated in the clockwise direction, as viewed in FIG. 17; whereby the cam 168 is rotated in the clockwise direction allowing the workplate 167 to move downwardly under the bias of the tension spring 197 so that the valve plate 166 is moved away from the lower open end of the conduit 130, in order to open the sump 102 into the lower open end of the conduit 130, and thus into the tube 125 that is now connected to the receiving bin, not shown. In passing, it is mentioned that the operating shaft 164 may be selectively controlled, in order to obtain any desired throttle opening of the valve plate 166 with respect to the adjacent open end of the conduit 130. The high pressure air supply is then opened into the high pressure air nozzle 120 and is thus supplied into the connected air chambers 110, 109, 105, 106, 113 and 114. From the air chambers 110 and 109 the high pressure air passes via the snorkel tubes 178 and 181 into the air chamber 177 within the valve mechanism 160, but without effect at this time, so that the valve element 167 is restrained downwardly by the tension spring 107 and in its open position with respect to the adjacent open end of the conduit 130. The air passes from the air chambers 105 and 106 through the adjacent fabrics 117 and 118 and into the cement contained in the lading compartment and therethrough into the dome structure 70 and thence into the jet pipes 91 and 92 and thus into the connected blow pipes 131 and 132. At this time, the butterfly valves 137 and 138 are closed, so that the interior of the tube 125 is somewhat above atmospheric pressure resulting from the connection of the sump 102 to the conduit 130 with the valve element 166 in its open position. Consequently, the cement is forced by the air pressure in the lading compartment through the sump 102 and into the lower end of the conduit 130 and rises therein into the midsection of the tube 125.

The operator then actuates the lever 144 at the righthand side of the body shell 40, as viewed in FIG. 11; whereby the butterfly valve 138 is operated into its open position; with the result that the high pressure air in the blow pipe 132 feeds through the elements 136, 138, 140 and 142 into the left-hand end portion of the tube 125 and then passes therethrough toward the right and out of the open right-hand end of the tube 125 and ultimately to the receiving bin, not shown. The rush of the air stream to the right through the tube 125 lifts the cement through the conduit 130 and entrains the same into the high pressure air stream that is conducted to the receiving bin, thereby to effect unloading of the cement from the sump 102 to the receiving bin. The load of cement in the pneumatic unloading equipment extending from the right-hand open end of the tube 125 to the receiving bin stoppers the same adequately, so that no unusually high pressure is present at the receiving bin during the unloading of the cement from the body shell.

Also, the passage of the high pressure air from the air chambers 105 and 106 and through the respective porous fabrics, effects aeration of fluidization of the adjacent layers of the cement in the lading compartment; whereby such adjacent layers of fluidized cement slide down the fabrics 117 and 118 from both ends of the lading compartment and empty into the sump 102 disposed at the lower ends of the two sections of the fabric 117 and at the lower ends of the two sections of the fabric 118; whereby both ends of the lading compartment are simultaneously emptied into the sump 102 and unloaded therefrom to the receiving bin via the pneumatic unloading equipment, as described above.

While there is cement in the lading compartment to be unloaded, there is substantial air pressure in the sump 102, as well as in the air chamber 177 disposed below the diaphragm 165, whereby the differential pressures exerted upon the opposite sides of the diaphragm 165 act with the differential pressures acting upon the opposite sides of the diaphragm 176 and with the force of the tension spring 197, to restrain the valve element 166 downwardly into its open position with respect to the adjacent open end of the conduit 130. Moreover, the friction drag of the cement in the pneumatic unloading equipment prevents undue high pressure in the receiving bin, whereby there is no damage to the receiving bin at this time, as previously noted.

On the other hand, when substantially all of the cement has been unloaded from the lading compartment defined in the body shell 40, pressure in the pneumatic unloading equipment rises rapidly producing a corresponding rapid rise in the pressure in the receiving bin, unless the valve mechanism 160 is quickly operated at this time back into its closed position to throttle the flow of high pressure air from the lading compartment defined in the body shell 40 via the tube 125 and into the pneumatic unloading equipment and thus into the receiving bin. This is known as the "bubble" effect, and unless the same is prevented, the rapid rise of the air pressure in the receiving bin represents an "explosion" therein; whereby the receiving bin is damaged, or on occasion, completely destroyed or split open.

The valve mechanism 160 comprises an automatic valve that prevents the above described "bubble" effect at the conclusion of the unloading of the cement from the lading compartment; and specifically, the valve element 166 is automatically operated into its closed position at this time, as explained more fully below. More particularly, at the conclusion of the unloading of the cement from the sump 102, the pressure in the sump 102 might fall from about 25 p.s.i.g. to about 12 p.s.i.g.; the pressure in the lower end of the conduit 130 might fall from about 25 p.s.i.g. to about 12 p.s.i.g.; the pressure in the air chamber 177 might fall from about 27 p.s.i.g. to about 17 p.s.i.g.; and the pressure in the air chamber 184 remains at about 0 p.s.i.g., or at atmospheric pressure. These pressure changes bring about a resultant upward force upon the diaphragm 165; whereby the diaphragm 165 and the plates 167 and 166 move upwardly against the bias of the tension spring 197. When the valve element 166 thus moves into its closed position with respect to the lower open end of the conduit 130, the pressure within the conduit 130 is further reduced, so that the pressure of the air in the air chamber 177 readily restrains the diaphragm 165 in its upward position, restraining the valve element 166 in its closed position with respect to the lower open end of the conduit 130, so as to disconnect the sump 102 from the conduit. At this time, there is some passage of air from the lading compartment defined in the body shell 40 via the elements 92, 132, 136, 138, 140 and 142 into the tube 125, but these elements are of small cross-sectional area, and the butterfly valve 138 produces substantial throttling of the high pressure air into the tube 125; whereby the air pressure in the tube 125 and in the connected pneumatic unloading equipment is of no moment, so that there is no "bubble" effect and there is no damage to the receiving bin.

Thereafter, at his convenience, the operator may close the high pressure air supply and disconnect the same from the high pressure air nozzle 120, and then return the cap thereon. Subsequently, the operator disconnects the pneumatic unloading equipment from the right-hand end of the tube 125. When the pressure in the lading compartment subsides, the pressure in the air chamber 177 falls, so that the tension spring 197 reoperates the valve element 166 into its open position reconnecting the sump 102 to the conduit 130; whereby all of the excess air in the lading compartment rushes through the tube 125 and out of the open right-hand end thereof, so that the pressure within the lading chamber is again reduced to atmospheric pressure. The operator then actuates the lever 144 to operate the butterfly valve 138 back into its closed position and actuates the handwheel 208 to operate the valve element 166 back into its closed position with respect to the adjacent open end of the conduit 130. Finally, the operator replaces the cap 128 upon the right-hand open end of the tube 125.

Assuming that the cement is to be unloaded from the left-hand side of the body shell 40, as viewed in FIG. 11, the operations proceed in a manner substantially identical to those described above, except that in this case the cap 128 on the left-hand end of the tube 125 is removed; and the pneumatic unloading equipment is connected to the left-hand open end of the tube 125. The valve mechanism 160 is operated into its open position employing the handwheel 209, and the butterfly valve 137 is operated into its open position employing the hand lever 143. In this case, the high pressure air from the blow pipe 131 proceeds through the elements 135, 137, 139 and 141, into the right-hand end of the tube 125; whereby the air passes through the tube 125 toward the left and into the pneumatic unloading equipment connected to the left-hand end of the tube 125. The passage of the air towards the left through the tube 125 effects pick-up of the cement at the top of the conduit 130, and the entrainment of the cement therein in the manner previously described. The unloading of the lading compartment and the subsequent automatic closure of the valve mechanism 160, upon completion of the unloading operation, are the same as described. Finally, the operator readies the railway car 30 for reuse, all in the manner previously described, employing the hand lever 143 and the handwheel 209, in this case.

In a constructional example of the railway car 30, employing the body shell 40 having a volume of about 2,800 cu. ft. and utilizing a relatively high air pressure in the general range 15 p.s.i.g to 40 p.s.i.g. in the unloading operation, each of the end sections 42 may have a length between the adjacent central section 41 and the adjacent end header 43 of about 191 7/16″ and an internal diameter of about 127″. The overall length of the railway car 30 between the striker plates at the outer extremities of the stub draft sills 50 may be about 470″. The bottom of the ring 101 should be disposed about 19″ above the top of the rails; and the other dimensions may be generally related in accordance with the scales of the drawings, as illustrated.

In view of the foregoing, it is apparent that there has been provided a railway car for transporting pulverulent material ladings that is of improved and simplified construction and arrangement; whereby the lading may be readily loaded and unloaded with respect to the body shell employing corresponding loading and unloading systems of the pneumatic type; wherein the body shell may be loaded from either end thereof by the pneumatic loading system; and wherein the body shell may be unloaded from either side thereof by the pneumatic unloading system. Also, the body shell is of improved construction and arrangement, so that it is of exceedingly strong structure, requiring no underframe, and being capable of withstanding internal unloading air pressures at least as high as 50 p.s.i.g., with a normal unloading pressure in the general range 15 p.s.i.g. to 40 p.s.i.g. Further, the body shell incorporates an improved structural arrangement for aerating or fluidizing the pulverulent material lading, so as positively to insure easy and complete unloading of the body shell by the pneumatic unloading system employing relatively high pressure air. Moreover, the pneumatic unloading system incorporates an improved automatic valve mechanism that is automatically closed upon completion of the unloading operation, thereby positively to prevent the "bubble" effect so as positively to prevent damage to the receiving bin, at this time. This arrangement is very advantageous, since it renders practical such a high pressure unloading system, without danger to the receiving bin, so that the pulverulent material may be unloaded directly from the railway car to the receiving bin without intermediate apparatus, except a connecting conduit or pipe, even though the receiving bin is located 10 to 20 stories above the railway track. Furthermore, the automatic valve mechanism accommodates ready manual presetting or throttle control of the pressure of the pneumatic unloading system, so that there is no problem involved in matching the pneumatic unloading system to the pneumatic characteristics of the receiving bin on the premises of the consignee.

While there has been described what is at present considered to be the preferred embodiment of the invention, it will be understood the various modifications may be made therein, and it is intended to cover in the appended claims all such modifications as fall within the true spirit and scope of the invention.

What is claimed is:

1. A railway car comprising an elongated longitudinally extending body shell defining a fluid-tight enclosure and adapted to receive a pulverulent material lading, said body shell being of self-supporting rigid construction including a substantially cylindrical central section and a pair of substantially cylindrical end sections and a pair of end headers, the inner ends of said end sections being respectively joined to the opposite outer ends of said central section and the outer ends of said end sections being respectively joined to said end headers, the longitudinal centerline of said central section being disposed in a substantially horizontal position, the longitudinal centerlines of said end sections being respectively disposed in two upwardly and oppositely inclined positions, whereby the top of said central section is disposed well below the tops of said end headers and the bottom of said central section is disposed well below the bottoms of said end headers, a pair of longitudinally aligned stub draft sills respectively arranged below the opposite ends of said body shell and respectively provided with hollow outer ends adapted respectively to receive a pair of draft gears, the outer ends of said stub draft sills respectively projecting outwardly below the adjacent ones of said end headers and the inner ends of said stub draft sills being respectively rigidly secured to the lower intermediate portions of the adjacent ones of said end sections, said body shell constituting the only connection between said stub draft sills for the transmission of the total draft force therebetween, a beam arranged above the top of said central section and above the tops of the inner ends of said end sections and rigidly secured to the adjacent portions of said sections so as to reinforce the top of said body shell in order to prevent any substantial deformation thereof incident to the transmission therethrough of the total draft force between said stub draft sills, a pair of loading nozzles respectively carried by said end headers, each of said loading nozzles communicating between the exterior and the adjacent end portion of said body shell and accommodating the pneumatic loading of the pulverulent material into said body shell, a pair of manway structures respectively carried by the tops of said end sections, each of said manway structures communicating between the exterior and the adjacent upper end portion of said body shell, and an unloading nozzle carried by said central section and communicating between the exterior and the lower central portion of said body shell and accommodating the pneumatic unloading of the pulverulent material from said body shell.

2. The railway car set forth in claim 1, and further comprising longitudinally extending platform structure disposed above the top central portions of said three sections named and rigidly secured to said body shell and constituting a catwalk therefor, said manway structures being respectively disposed on opposite sides of said platform structure and thus respectively laterally offset on opposite sides of the longitudinal axis of said body shell.

3. A railway car comprising an elongated longitudinally extending tubular body shell defining a fluid-tight enclosure and adapted to receive a pulverulent material lading, means accommodating the loading of the pulverulent material into said body shell, means defining a sump in the central bottom portion of said body shell, first structure defining a pair of elongated longitudinally extending and laterally spaced-apart first troughs in a first end section of said body shell, each of said first troughs extending from an upper position disposed adjacent to the extremity of said first end section of said body shell to a lower position disposed adjacent to said sump, second structure defining a pair of elongated longitudinally extending and laterally spaced-apart second troughs in a second end section of said body shell, each of said second troughs extending from an upper position disposed adjacent to the extremity of said second end section of said body shell to a lower position disposed adjacent to said sump, the lower ends of said four troughs named commonly communicating with said sump, a pair of elongated longitudinally extending porous first elements respectively closing the bottoms of said first troughs and contacting the pulverulent material therein, a pair of elongated longitudinally extending porous second elements respectively closing the bottoms of said second troughs and contacting the pulverulent material therein, said first structure also defining a pair of elongated longitudinally extending plenum chambers respectively disposed below said first troughs and respectively communicating with said first elements, said second structure also defining a pair of elongated longitudinally extending plenum chambers respectively disposed below said second troughs and respectively communicating with said second elements, means for supplying air under superatmospheric pressure into said plenum chambers, whereby the air under superatmospheric pressure from said plenum chambers penetrates said elements and accumulates in said body shell and also fluidizes the adjacent portions of the pulverulent material in the bottoms of said troughs causing the fluidized pulverulent material to feed downwardly along said elements into said sump, a tube carried by said body shell, means defining a passage between said sump and said tube, and valve mechanism within said shell and at said sump cooperating with said passage and selectively operative to open and to close the same, whereby the pulverulent material feed into said sump may be unloaded therefrom through said passage with said valve mechanism in its open position and then blown by the air under superatmospheric pressure through said tube to the exterior of said body shell.

4. The railway car set forth in claim 3, and further comprising means providing ducts respectively communicating between said plenum chambers and the adjacent spaces disposed between said structures and said body shell so as to minimize pressure differences between the opposite sides of said structures.

5. The railway car set forth in claim 3, and further comprising a vent pipe communicating between the upper portion of said body shell and said tube, and a valve arranged in said vent pipe, whereby air under superatmospheric pressure may be selectively blown through said tube so as to control the unloading of the pulverulent material through said tube to the exterior of said body shell.

6. A vehicle comprising an elongated longitudinally extending tubular body shell defining a fluid-tight enclosure and adapted to receive a pulverulent material lading, means accommodating the loading of the pulverulent material into said body shell, means defining a sump in the central bottom portion of said body shell, means for feeding the pulverulent material in said body shell into said sump, means for supplying air under superatmospheric pressure into said body shell, a laterally extending tube carried by the central bottom portion of said body shell and provided with open outer ends respectively disposed adjacent to the opposite sides of said body shell and readily accessible from the exterior, a pair of closure caps respectively removably carried by the opposite ends of said tube, structure providing a passage between the midsection of said tube and said sump, valve mechanism within said shell and at said sump cooperating with said passage and selectively operative to open and to close the same, whereby the pulverulent material in said body shell may be unloaded therefrom through said sump and said passage into said tube with said valve mechanism in its open position and then blown by the air under superatmospheric pressure through either open end of said tube with the corresponding one of said closure caps in its open condition, and means for selectively controlling operation of said valve mechanism between its open and closed positions.

7. The vehicle set forth in claim 6, wherein said means for selectively controlling operation of said valve mechanism includes a pair of handle members carried by the central portion of said body section and respectively positioned adjacent to and exteriorly of the opposite sides of said body shell, whereby the operation of said valve mechanism may be manually selectively controlled from either side of said body shell.

8. A vehicle comprising an elongated longitudinally extending tubular body shell defining a fluid-tight enclosure and adapted to receive a pulverulent material lading, means accommodating the loading of the pulverulent material into said body shell, means defining a sump in the central bottom portion of said body shell, a pair of elongated longitudinally extending pneumatic conveyors respectively disposed in the bottoms of the opposite ends of said body shell and with the inner ends of said pneumatic conveyors respectively communicating with the adjacent portions of said sump, means for supplying air under superatmospheric pressure to said pneumatic conveyors in order to effect operation thereof to feed the pulverulent material in the opposite ends of said body shell into said sump, whereby air under superatmospheric pressure is supplied from said pneumatic conveyors into said body shell, a laterally extending tube carried by the central bottom portion of said body shell and provided with open outer ends respectively disposed adjacent to the opposite sides of said body shell and readily accessible from the exterior, a pair of closure caps respectively removably carried by the opposite ends of said tube, structure providing a passage between the midsection of said tube and said sump, valve mechanism within said shell and at said sump cooperating with said passage and selectively operative to open and to close the same, whereby the pulverulent material in said body shell may be unloaded therefrom through said sump and said passage into said tube with said valve mechanism in its open position and then blown by the air under superatmospheric pressure through either open end of said tube with the corresponding one of said closure caps in its open condition, and means for selectively controlling operation of said valve mechanism between its open and closed positions.

9. A vehicle comprising an elongated longitudinally extending tubular body shell defining a fluid-tight enclosure and adapted to receive a pulverulent material lading, means accommodating the loading of the pulverulent material into said body shell, means defining a sump in the central bottom portion of said body shell, means for feeding the pulverulent material in said body shell into said sump, means for supplying air under superatmospheric pressure into said body shell, a tube extending laterally through the central lower portion of said body shell and provided with open outer ends respectively disposed adjacent to and exteriorly of the opposite sides of said body shell, a pair of closure caps respectively removably carried by the opposite ends of said tube, a depending conduit carried by the midportion of said tube within said body shell and projecting downwardly from said tube into said sump, the upper end of said conduit communicating with the interior of said tube and the lower end of said conduit being open, a valve element arranged in said sump and selectively movable between open and closed positions with respect to the lower end of said conduit, and means for selectively controlling operation of said valve element between its open and closed positions, whereby the pulverulent material in said body shell may be unloaded therefrom through said sump and said conduit into said tube with said valve element in its open position and then blown by the air under superatmospheric pressure through either open end of said tube with the corresponding one of said closure caps in its open condition.

10. A vehicle comprising an elongated longitudinally extending tubular body shell defining a fluid-tight enclosure and adapted to receive a pulverulent material lading, means accommodating the loading of the pulverulent material into said body shell, means defining a sump in the central bottom portion of said body shell, means for feeding the pulverulent material in said body shell into said sump, means for supplying air under superatmospheric pressure into said body shell, a laterally extending tube carried by the central bottom portion of said body shell and provided with open outer ends respectively disposed adjacent to the opposite sides of said body shell and readily accessible from the exterior, a pair of closure caps respectively removably carried by the opposite ends of said tube, structure providing a passage between the midsection of said tube and said sump, a first pipe comunicating between the central top of said body shell and one end portion of said tube, a second pipe communicating between the central top of said body shell and the other end portion of said tube, first and second valves respectively arranged in said first and second pipes, and means for selectively controlling operation of said valves between their open and closed positions, said first valve in its open position accommodating the flow of the air under superatmospheric pressure from the interior of said body shell via said first pipe through said tube in a first direction and thence out of the other open end of said tube with the corresponding second of said closure caps in its open condition, said second valve in the open position accommodating the flow of the air under superatmospheric pressure from the interior of said body shell via said second pipe through said tube in a second direction and thence out of the one open end of said tube with the corresponding first of said closure caps in its open condition, the flow of the air under superatmospheric pressure through said tube in either direction effecting conveying in the corresponding direction through said tube of the pulverulent material flowing from said sump through said passage and into said tube, whereby the pulverulent material may be pneumatically unloaded from said body shell through either desired open end of said tube to the exterior.

11. The vehicle set forth in claim 10, wherein said means for selectively controlling operation of said valves includes a pair of handle members carried by the central portion of said body section and respectively positioned adjacent to and exteriorly of the opposite sides of said body shell, whereby the operation of said valves may be manually selectively controlled from the sides of said body shell.

12. The vehicle set forth in claim 10, and further comprising valve mechanism for selectively controlling the flow of the pulverulent material from said sump through said passage and into said tube.

13. A vehicle comprising an elongated longitudinally extending tubular body shell defining a fluid-tight enclosure and adapted to receive a pulverulent material lading, means accommodating the loading of the pulverulent material into said body shell, means defining a sump in the central bottom portion of said body shell, means for feeding the pulverulent material in said body shell into said sump, means for supplying air under superatmospheric pressure into said body shell, a laterally extending tube carried by the central bottom portion of said body shell and provided with open outer ends respectively disposed adjacent to the opposite sides of said body shell and readily accessible from the exterior, a pair of closure caps respectively removably carried by the opposite ends of said tube, structure providing a passage between the midsection of said tube and said sump, an upstanding casing carried by the central top of said body shell and defining a dome chamber therein communicating with the interior of the central top of said body shell, a first pipe communicating between said dome chamber and one end portion of said tube, a second pipe communicating between said dome chamber and the other end portion of said tube, first and second valves respectively arranged in said first and second pipes, and means for selectively controlling operation of said valves between their open and closed positions, said first valve in its open position accommodating the flow of the air under superatmospheric pressure from the interior of said body shell into said dome chamber and therefrom via said first pipe through said tube in a first direction and over the adjacent end of said passage and thence out of the other open end of said tube with the corresponding second of said closure caps in its open condition, said second valve in its open position accommodating the flow of the air under superatmospheric pressure from the interior of said body shell into said dome chamber and therefrom via said second pipe through said tube in a second direction and over the adjacent end of said passage and thence out of the open end of said tube with the corresponding first of said closure caps in its open condition, the flow of the air under superatmospheric pressure through said tube in either direction over the adjacent end of said passage effecting the flow of the pulverulent material from said sump through said passage and into said tube, whereby the pulverulent material may be pneumatically unloaded from said body shell through either desired open end of said tube to the exterior.

14. The vehicle set forth in claim 13, and further comprising pressure-relief valve mechanism carried by said upstanding casing and responsive to predetermined overpressure of the superatmospheric pressure of the air in said dome chamber to conduct some of the air from said dome chamber to the exterior.

15. A vehicle comprising an elongated longitudinally extending tubular body shell defining a fluid-tight enclosure and adapted to receive a pulverulent material lading, means accommodating the loading of the pulverulent material into said body shell, means defining a sump in the central bottom portion of said body shell, means for feeding the pulverulent material in said body shell into said sump, means for supplying air under superatmospheric pressure into said body shell, a laterally extending tube carried by the central bottom portion of said body shell and provided with open outer ends respectively disposed adjacent to the opposite sides of said body shell and readily accessible from the exterior, a pair of closure caps respectively removably carried by the opposite ends of said tube, structure providing a passage between the midsection of said tube and said sump, valve mechanism cooperating with said passage and selectively operative to open and to close the same, whereby the pulverulent material in said body shell may be unloaded therefrom through said sump and said passage into said tube with said valve mechanism in its open position and then blown by the air under superatmospheric pressure through either open end of said tube with the corresponding one of said closure caps in its open condition, and automatic means controlled by the superatmospheric pressure of the air in said sump for selectively operating said valve mechanism between its open and closed positions, said automatic means being responsive to a relatively high superatmospheric pressure of the air in said sump for operating said valve mechanism into its open position and responsive to a relatively low superatmospheric pressure of the air in said sump for operating said valve mechanism into its closed position.

16. The vehicle set forth in claim 15, and further comprising a manually operable device for selectively operating said valve mechanism and for selectively governing said automatic means, said manually operable device having a first position operating said valve mechanism into its closed position and disabling said automatic means and a second position enabling said automatic means.

17. A railway car comprising an elongated longitudinally extending body shell defining a fluid-tight enclosure and adapted to receive a pulverulent material lading, said body shell being of self-supporting rigid construction including a substantially cylindrical central section and a pair of substantially cylindrical end sections and a pair of end headers, the inner ends of said end sections being respectively joined to the opposite outer ends of said central section and the outer ends of said end sections being respectively joined to said end headers, the lower portion of said central section being disposed in a substantially horizontal position, the lower portions of said end sections being respectively disposed in two upwardly and oppositely inclined positions, a pair of longitudinally aligned stub draft sills respectively arranged below the opposite ends of said body shell and respectively provided with hollow outer ends adapted respectively to receive a pair of draft gears, the outer ends of said stub draft sills respectively projecting outwardly below the adjacent ones of said end headers and the inner ends of said stub draft sills being respectively rigidly secured to the lower intermediate portions of the adjacent ones of said end sections, said body shell constituting the only connection between said stub draft sills for the transmission of the total draft force therebetween, means accommodating the loading of the pulverulent material into said body shell, means defining a sump in the central bottom portion of said body shell, an unloading nozzle carried by said central section and communicating between said sump and the exterior, and means for supplying air under superatmospheric pressure in the general range 15 p.s.i.g. to 40 p.s.i.g. into said unloading nozzle to effect the unloading of the pulverulent material from said body shell to the exterior via said unloading nozzle.

18. The railway car set forth in claim 17, and further comprising valve means arranged between said sump and said unloading nozzle for selectively controlling the unloading of the pulverulent material from said body shell.

19. A vehicle comprising an elongated longitudinally extending tubular body shell defining a fluid-tight enclosure and adapted to receive a pulverulent material lading, means accommodating the loading of the pulverulent material into said body shell, means defining a sump in the central bottom portion of said body shell, means for feeding the pulverulent material in said body shell into said sump, means for supplying air under superatmospheric pressure into said body shell, a laterally extending tube carried by the central bottom portion of said body shell and provided with open outer ends respectively disposed adjacent to the opposite sides of said body shell and readily accessible from the exterior, a pair of closure caps respectively removably carried by the opposite ends of said tube, structure providing a passage between the midsection of said tube and said sump, valve mechanism cooperating with said passage and selectively operative to open and to close the same, whereby the pulverulent material in said body shell may be unloaded therefrom through said sump and said passage into said tube with said valve mechanism in its open position and then blown by the air under superatmospheric pressure through either open end of said tube with the corresponding one of said closure caps in its open condition, and means governed by the pressure of the air in said body shell for selectively operating said valve mechanism between its open and closed positions.

20. The vehicle set forth in claim 19, wherein said valve mechanism essentially comprises a valve element selectively movable between open and closed positions with respect to a valve seat provided on said structure, and said means for selectively operating said valve mechanism essentially comprises a flexible diaphragm subject to the pressure of the air in said body shell and carrying said valve element.

21. A vehicle comprising an elongated longitudinally extending tubular body shell defining a fluid-tight enclosure and adapted to receive a pulverulent material lading, means accommodating the loading of the pulverulent material into said body shell, means defining a sump in the central bottom portion of said body shell, a pair of elongated longitudinally extending pneumatic conveyors respectively disposed in the bottoms of the opposite ends of said body shell and with the inner ends of said pneumatic conveyors respectively communicating with the adjacent portions of said sump, means for supplying air under superatmospheric pressure to said pneumatic conveyors in order to effect operation thereof to feed the pulverulent material in the opposite ends of said body shell into said sump, whereby air under superatmospheric pressure is supplied from said pneumatic conveyors into said body shell, a laterally extending tube carried by the central bottom portion of said body shell and provided with open outer ends respectively disposed adjacent to the opposite sides of said body shell and readily accessible from the exterior, a pair of closure caps respectively removably carried by the opposite ends of said tube, structure providing a passage between the midsection of said tube and said sump, valve mechanism cooperating with said passage and selectively operative to open and to close the same, whereby the pulverulent material in said body shell may be unloaded therefrom through said sump and said passage into said tube with said valve mechanism in its open position and then blown by the air under super-atmospheric pressure through either open end of said tube with the corresponding one of said closure caps in its open condition, and means governed by the pressure of the air in said body shell for selectively operating said valve mechanism between its open and closed positions.

22. A vehicle comprising an elongated longitudinally extending tubular body shell defining a fluid-tight enclosure and adapted to receive a pulverulent material lading, means accommodating the loading of the pulverulent material into said body shell, means defining a sump in the central bottom portion of said body shell, means for feeding the pulverulent material in said body shell into said sump, means for supplying air under superatmospheric pressure into said body shell, a laterally extending tube carried by the central bottom portion of said body shell and provided with an open outer end disposed adjacent to one side of said body shell and readily accessible from the exterior, structure providing a passage between the midsection of said tube and said sump, valve mechanism cooperating with said passage and selectively operative to open and to close the same, whereby the pulverulent material in said body shell may be unloaded therefrom through said sump and said passage into said tube with said valve mechanism in its open position and then blown by the air under superatmospheric pressure through the open end of said tube, and means governed by the pressure of the air in said body shell for selectively operating said valve mechanism between its open and closed positions.

23. The vehicle set forth in claim 22, wherein said valve mechanism essentially comprises a valve element selectively movable between open and closed positions with respect to a valve seat provided on said structure, and said means for selectively operating said valve mechanism essentially comprises a flexible diaphragm subject to the pressure of the air in said body shell and carrying said valve element.

24. A vehicle comprising an elongated longitudinally extending tubular body shell defining a fluid-tight enclosure and adapted to receive a pulverulent material lading, means accommodating the loading of the pulverulent material into said body shell, means defining a sump in the central bottom portion of said body shell, means for feeding the pulverulent material in said body shell into said sump, means for supply air under superatmospheric pressure into said body shell, a laterally extending tube carried by the central bottom portion of said body shell and provided with an open outer end disposed adjacent to one side of said body shell and readily accessible from the exterior, structure providing a passage between the midsection of said tube and said sump, valve mechanism cooperating with said passage and selectively operative to open and to close the same, whereby the pulverulent material in said body shell may be unloaded therefrom through said sump and said passage into said tube with said valve mechanism in its open position and then blown by the air under superatmospheric pressure through the open end of said tube, and automatic means controlled by the superatmospheric pressure of the air in said sump for selectively operating said valve mechanism between its open and closed positions, said automatic means being responsive to a relatively high superatmospheric pressure of the air in said sump for operating said valve mechanism into its open position and responsive to a relatively low superatmospheric pressure of the air in said sump for operating said valve mechanism into its closed position.

25. A vehicle comprising an elongated longitudinally extending body shell defining a fluid-tight enclosure and adapted to receive a pulverulent material lading, said body shell being of self-supporting rigid construction including a substantially cylindrical central section and a pair of substantially cylindrical end sections and a pair of end headers, the lower portion of said central section being disposed in a substantially horizontal position, the lower portions of said end sections being respectively disposed in two upwardly and oppositely inclined positions, means defining a sump in the central bottom portion of said body shell, means for feeding the pulverulent material in said body shell into said sump, means for supplying air under superatmospheric pressure into said body shell, a laterally extending tube carried by the central bottom portion of said body shell and provided with an open outer end disposed adjacent to one side of said body shell and readily accessible from the exterior, structure providing a passage between the midsection of said tube and said sump, valve mechanism cooperating with said passage and selectively operative to open and to close the same, whereby the pulverulent material in said body shell may be unloaded therefrom through said sump and said passage into said tube with said valve mechanism in its open position and then blown by the air under superatmospheric pressure through the open end of said tube, and means governed by the pressure of the air in said body shell for selectively operating said valve mechanism between its open and closed positions.

26. A vehicle comprising an elongated longitudinally extending tubular body shell defining a fluid-tight enclosure and adapted to receive a pulverulent material lading, means accommodating the loading of the pulverulent material into said body shell, means defining a sump in the central bottom portion of said body shell, means for feeding the pulverulent material in said body shell into said sump, means for supplying air under superatmospheric pressure into said body shell, a laterally extending tube carried by the central bottom portion of said body shell and provided with an open outer end disposed adjacent to one side of said body shell and readily accessible from the exterior, structure providing a passage between the midsection of said tube and said sump, a pipe communicating between the central top of said body shell and a portion of said tube disposed on the side of said passage opposite said open outer end, a valve arranged in said pipe and in its open position accommodating the flow of air under superatmospheric pressure from the interior of said body shell via said pipe through said tube and thence out of the open end of said tube, the flow of air under superatmospheric pressure through said tube effecting conveying through said tube of the pulverulent material flowing from said sump through said passage and into said tube, valve mechanism cooperating with said passage and selectively operative to open and to close the same, and means governed by the pressure of the air in said body shell for selectively operating said valve mechanism between its open and closed positions.

27. A vehicle comprising an elongated longitudinally extending tubular body shell defining a fluid-tight enclosure and adapted to receive a pulverulent material lading, means accommodating the loading of the pulverulent material into said body shell, means defining a sump in the central bottom portion of said body shell, means for feeding the pulverulent material in said body shell into said sump, means for supplying air under superatmospheric pressure into said body shell, a laterally extending tube carried by the central bottom portion of said body shell and provided with open outer ends respectively disposed adjacent to the opposite sides of said body shell and readily accessible from the exterior, a pair of closure caps respectively removably carried by the opposite ends of said tube, structure providing a passage between the midsection of said tube and said sump, a first pipe communicating between the central top of said body shell and one end portion of said tube, a second pipe communicating between the central top of said body shell and the other end portion of said tube, first and second valves respectively arranged in said first and second pipes, means for selectively controlling operation of said valves between their open and closed positions, said first valve in the open position accommodating the flow of the air under superatmospheric pressure from the interior of said body shell via said first pipe through said tube in a first direction and thence out of the other open end of said tube with the corresponding second of said closure caps in its open condition, said second valve in the open position accommodating the flow of the air under superatmospheric pressure from the interior of said body shell via said second pipe through said tube in a second direction and thence out of the one open end of said tube with the corresponding first of said closure caps in its open condition, the flow of the air under superatmospheric pressure through said tube in either direction effecting conveying in the corresponding direction through said tube of the pulverulent material flowing from said sump through said passage and into said tube, valve mechanism cooperating with said passage and selectively operative to open and to close the same, and means governed by the pressure of air in said body shell for selectively operating said valve mechanism between its open and closed positions.

28. A vehicle comprising an elongated longitudinally extending body shell defining a fluid-tight enclosure and adapted to receive a pulverulent material lading, said body shell being of self-supporting rigid construction including a substantially cylindrical central section and a pair of substantially cylindrical end sections and a pair of end headers, the lower portion of said central section being disposed in a substantially horizontal position, the lower portions of said end sections being respectively disposed in two upwardly and oppositely inclined positions, means defining a sump in the central bottom portion of said body shell, means for feeding the pulverulent material in said body shell into said sump, means for supplying air under superatmospheric pressure into said body shell, a laterally extending tube carried by the central bottom portion of said body shell and provided with an open outer end disposed adjacent to one side of said body shell and readily accessible from the exterior, structure providing a passage between the midsection of said tube and said sump, a pipe communicating between the central top of said body shell and the end of said tube disposed on the side of said passage opposite said open outer end, a valve arranged in said pipe and in its open position accommodating the flow of the air under superatmospheric pressure from the interior of said body shell via said pipe through said tube and thence out of the open end of said tube, the flow of the air under superatmospheric pressure through said tube effecting conveying through said tube of the pulverulent material flowing from said sump through said passage and into said tube, valve mechanism cooperating with said passage and selectively operative to open and to close the same, and means governed by the pressure of the air in said body shell for selectively operating said valve mechanism between its open and closed positions.

29. A vehicle comprising an elongated longitudinally extending body shell defining a fluid-tight enclosure and adapted to receive a pulverulent material lading, said body shell being of self-supporting rigid construction including a substantially cylindrical central section and a pair of substantially cylindrical end sections and a pair of end headers, the lower portion of said central section being disposed in a substantially horizontal position, the lower portions of said end sections being respectively disposed in two upwardly and oppositely inclined positions, means defining a sump in the central bottom portion of said body shell, means for feeding the pulverulent material in said body shell into said sump, means for supplying air under superatmospheric pressure into said body shell, a laterally extending tube carried by the central bottom portion of said body shell and provided with open outer ends respectively disposed adjacent to the opposite sides of said body shell and readily accessible from the exterior, a pair of closure caps respectively removably carried by the opposite ends of said tube, structure providing a passage between the midsection of said tube and said sump, a first pipe communicating between the central top of said body shell and one end portion of said tube, a second pipe communicating between the central top of said body shell and the other end portion of said tube, first and second valves respectively arranged in said first and second pipes, means for selectively controlling operation of said valves between their open and closed positions, said first valve in its open position accommodating the flow of the air under superatmospheric pressure from the interior of said body shell via said first pipe through said tube in a first direction then out of the other open end of said tube with the corresponding second of said closure caps in its open condition, said second valve in the open position accommodating the flow of the air under superatmospheric pressure from the interior of said body shell via said second pipe through said tube in a second direction and thence out of the one open end of said tube with the corresponding first of said closure caps in its open condition, the flow of the air under superatmospheric pressure through said tube in either direction effecting conveying in the corresponding direction through said tube of the pulverulent material flowing from said sump through said passage and into said tube, valve mechanism cooperating with said passage and selectively operative to open and to close the same, and means governed by the pressure of the air in said body shell for selectively operating said valve mechanism between its open and closed positions.

References Cited

UNITED STATES PATENTS

| | | | |
|---|---|---|---|
| 2,901,133 | 8/1959 | Weller | 302—52 |
| 3,105,721 | 10/1963 | Collins | 302—52 |
| 3,212,824 | 10/1965 | Emery | 302—52 |
| 3,252,431 | 5/1966 | Phillips | 105—360 |
| 3,277,842 | 10/1966 | Schwartz | 105—358 |
| 3,277,843 | 10/1966 | Horner | 105—360 |

FOREIGN PATENTS 667,569   7/1963   Canada.

EDWARD A. SROKA, *Primary Examiner.*

EVON C. BLUNK, *Examiner.*

H. C. HORNSBY, *Assistant Examiner.*